United States Patent
Tang

(10) Patent No.: US 10,496,678 B1
(45) Date of Patent: Dec. 3, 2019

(54) SYSTEMS AND METHODS FOR GENERATING AND IMPLEMENTING KNOWLEDGE GRAPHS FOR KNOWLEDGE REPRESENTATION AND ANALYSIS

(71) Applicant: Federal Home Loan Mortgage Corporation (Freddie Mac), McLean, VA (US)

(72) Inventor: Yuang Tang, Baltimore, MD (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 254 days.

(21) Appl. No.: 15/593,113

(22) Filed: May 11, 2017

Related U.S. Application Data

(60) Provisional application No. 62/335,580, filed on May 12, 2016.

(51) Int. Cl.
  *G06F 17/30* (2006.01)
  *G06F 16/28* (2019.01)
  *G06F 16/29* (2019.01)

(52) U.S. Cl.
  CPC ............ *G06F 16/282* (2019.01); *G06F 16/29* (2019.01)

(58) Field of Classification Search
  CPC .................................................... G06F 16/367
  USPC ................................................. 707/797, 798
  See application file for complete search history.

(56) References Cited

U.S. PATENT DOCUMENTS

| | | | | |
|---|---|---|---|---|
| 8,244,769 | B2* | 8/2012 | Hosomi | G06F 16/367 707/794 |
| 2010/0121885 | A1* | 5/2010 | Hosomi | G06F 16/367 707/794 |
| 2012/0310959 | A1* | 12/2012 | Huhn | G06F 16/2282 707/756 |
| 2017/0262653 | A1* | 9/2017 | Dang | G06F 21/6254 |
| 2017/0277907 | A1* | 9/2017 | Dang | G06F 16/9024 |

* cited by examiner

*Primary Examiner* — Baoquoc N To
(74) *Attorney, Agent, or Firm* — Finnegan, Henderson, Farabow, Garrett & Dunner LLP

(57) ABSTRACT

This disclosure relates to knowledge generation and implementation. A knowledge graph system comprises at least one processor, at least one database communicatively connected to the at least one processor, and a memory storing executable instructions. When executed, the instructions cause the at least one processor to aggregate, from the at least one database, entity data for a plurality of homes. Attribute information identifying geographic locations of the plurality of homes and relationships between pairs of the plurality of homes is extracted from the aggregated data. Knowledge graph data structures are populated with the extracted attribute information. A home knowledge graph is built, having nodes corresponding to the plurality of homes and edges corresponding to the identified relationships. A hierarchical cluster tree structure of the plurality of homes is outputted, wherein levels of the hierarchical cluster tree correspond to clusters of homes determined based in part on the knowledge graph edges.

17 Claims, 22 Drawing Sheets

400

SYSTEMS AND METHODS FOR GENERATING AND IMPLEMENTING KNOWLEDGE GRAPHS FOR KNOWLEDGE REPRESENTATION AND ANALYSIS

TECHNICAL FIELD

This disclosure relates generally to knowledge graph generation and implementation, and more particularly to systems and methods for building knowledge graphs for knowledge representation and reasoning techniques associated with property data.

BACKGROUND

Multiple computer systems exist to determine property values, and these current systems are used in modern housing industries for property evaluation and setting prices. Automated valuation models for real estate appraisal typically rely on statistical models such as multiple regression analysis or geographic information systems (GIS). These systems, while widely used, suffer from multiple technical problems that ultimately result in incomplete or inaccurate property value data. The inventor here has recognized several technical problems with such conventional systems, as explained below.

First, current systems determine property value largely based on the average values for a zip code or other pre-defined neighborhood (such as a county, town, or subdivision). For example, multiple websites exist that allow a user to enter a street address of a property, and the website system estimates a value of the property based on average values for the entered zip code or predefined neighborhood where the property sits. While convenient, these conventional automated valuation models produce inaccurate results when they are used in certain neighborhoods. Many properties are included in these calculations solely because they are in the same general geographic area or zip code, and the resulting values can be very inaccurate when the appraised property does not conform well to the zip code or predefined neighborhood in which it resides. Indeed, many attributes that can differ between properties located in the same zip code or predefined neighborhood, in rural and city areas alike.

Second, current systems rely on traditional relational databases, such as SQL databases and lookup tables. The data architectures underlying such systems is inadequate for storing complex relationships between multiple entities. As a result, traditional relational databases are not technically suited for valuation modeling because of the limited nature of queries that can be executing on such databases. Even where a particular target query can theoretically be constructed from multiple queries on a relational database, multiple query results may need to be combined to acquire the data set necessary for valuation modeling, the database retrieval delays may be large, and additional computational overhead may be needed to combine the query results in a manner relevant to executing the automated valuation models.

As another example, relational databases typically store individual information about the relationships between any two given entities. When new entities and/or relationships are added, database entries grow exponentially to store all new relationships between individual entity pairs. At the scale required in current systems, the storage and computation requirements for maintaining and updating relational databases are unsustainable. Thus, traditional relational database architectures are unsuitable for use in a dynamic system having multiple complex relationships between entities. Such databases are not well suited to representing integrated collections of facts and relationships included in the real estate big data sets, or to extracting, analyzing or manipulating such large data sets in a manner relevant to valuation modeling. Finally, such relational databases are also inefficient for constructing queries for identifying real estate properties similar to other properties, a common type of query in this field.

In view of the technical problems discussed above, there exists a need for technological improvements to current systems.

SUMMARY

Disclosed embodiments present technological improvements as technical solutions to one or more of the above-mentioned technical problems recognized by the inventors in conventional systems. More particularly, disclosed embodiments address technical problems in current systems using knowledge graph technology in a manner not previously used in home valuation computer systems. Thus, the disclosed embodiments build new types of knowledge graphs using data that is aggregated from multiple networked sources, interpreted, and used to build knowledge graph data structures. Thus, the disclosed embodiments utilize data in techniques not previously applied in home industries, to generate knowledge graph-based models that overcome previous technical problems while increasing home valuation accuracy and utility.

In one embodiment, a knowledge graph computer system is disclosed, comprising at least one processor, at least one database communicatively connected to the at least one processor, and a memory storing executable instructions. When executed, the instructions may cause the at least one processor to perform operations including: aggregating, from the at least one database, entity data for a plurality of home; extracting, from the aggregated data, attribute information identifying geographic locations of the plurality of homes, and relationships between pairs of the plurality of homes; populating knowledge graph data structures with the extracted attribute information; building a home knowledge graph having nodes corresponding to the plurality of homes and edges corresponding to the identified relationships; and outputting a hierarchical cluster tree structure of the plurality of homes, wherein levels of the hierarchical cluster tree correspond to clusters of homes determined based in part on the knowledge graph edges.

In another embodiment, another knowledge graph computer system is disclosed, comprising: at least one processor, at least one database communicatively connected to the at least one processor, and a memory storing executable instructions. When executed, the stored instructions may cause the at least one processor to perform operations including: receiving, from the at least one database, knowledge graph data structures with node data and edge data, the node data corresponding to a plurality of homes, and the edge data corresponding to identified relationships between the plurality of homes; building a home knowledge graph having nodes and edges based on the node data and the edge data, the home knowledge graph having a hierarchical cluster tree structure of the plurality of homes, wherein levels of the hierarchical cluster tree correspond to clusters of homes determined based in part on the knowledge graph edges; identifying a first cluster of homes associated with a first level of the hierarchical cluster tree structure; determining, for each home in the first cluster, at least one vector proportionate to a first edge weight associated with the respective home; normalizing the determined vectors; identifying, based on the normalized vectors, a number of homes of the first cluster that are no longer associated with the first cluster; and responsive to a determination that the identified number of homes is below a predetermined threshold, assigning the identified homes to a second cluster, and adding the second cluster to the hierarchical cluster tree structure.

In other embodiments, non-transitory computer readable media are disclosed having stored thereon computer-executable instructions for configuring the systems and performing the methods disclosed herein.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EXEMPLARY EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
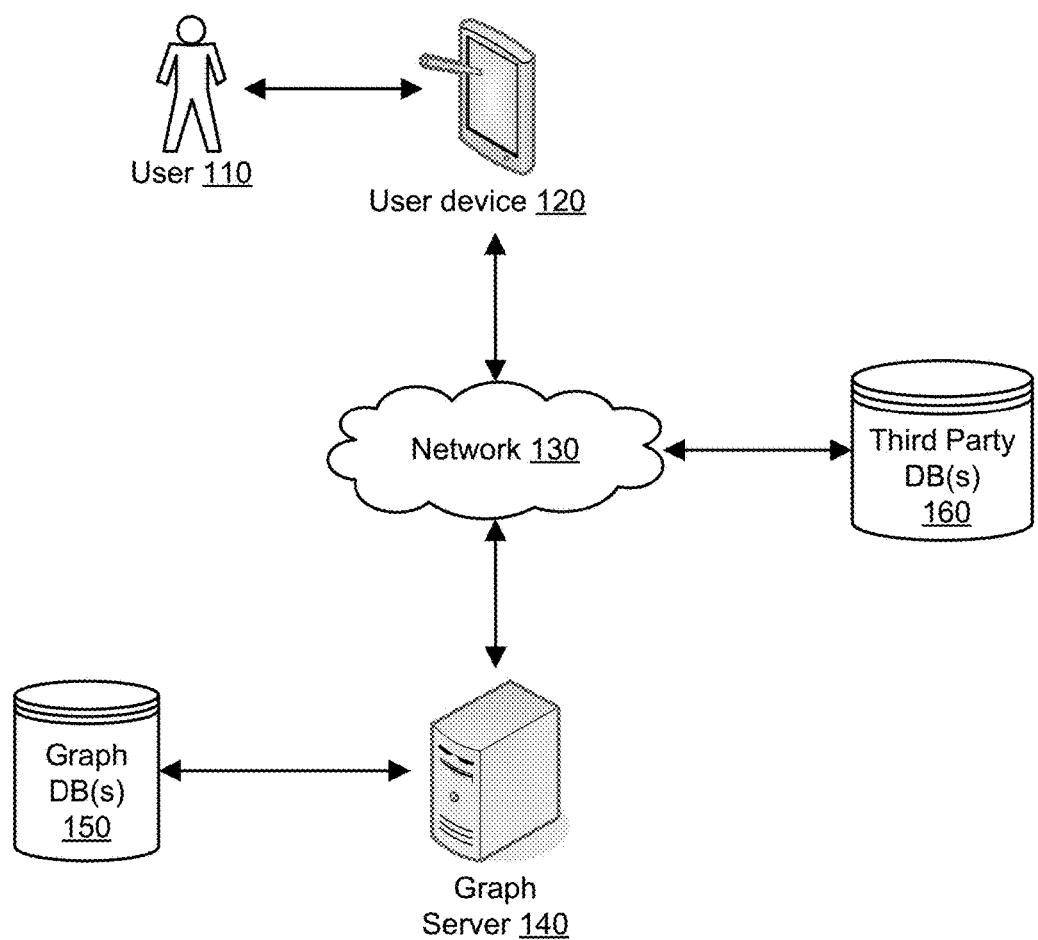
FIG. 1 illustrates an exemplary home knowledge graph representation and analysis system according to some embodiments of the present disclosure.

FIG. 1 illustrates an exemplary home knowledge graph representation and analysis system 100 according to some embodiments of the present disclosure. System 100 may be configured to perform one or more software processes that, when executed by one or more processors, perform methods consistent with disclosed embodiments. The components and arrangements shown in FIG. 1 are not intended to limit the disclosed embodiments, as the components used to implement the disclosed processes and features may vary.

In accordance with disclosed embodiments, system 100 may include one or more users 110, one or more user devices 120, a network 130, a graph server 140, and a graph database 150. Facility terminal 140 may be a standalone device placed in user 110's office, an employee station, or an alternative central location in a workplace. In some embodiments, terminal 140 may be a desktop or notebook computer, a flat panel or projected display, or any other display.

User 110 may be an employee in a workplace environment such as a nurse, a technician, a salesperson, or a customer service representative. User 110 may operate user device 120 or another computer (not shown) to interact with system 100.

User device 120 may be a personal computing device such as, for example, a general purpose or notebook computer, a mobile device with computing ability, a tablet, smartphone, wearable device such as Google Glass™ or smart watches, or any combination of these computers and/or affiliated components. In one embodiment, user device 120 may be a computer system or mobile computer device that is operated by user 110.

User device 120 may be connected to graph server 140 via a combination of one or more of local networks and/or network 130. Other components known to one of ordinary skill in the art may be included in system 100 to gather, process, transmit, receive, and provide account information consistent with the disclosed embodiments.

Graph server 140 may be operated by a facility such as a real estate appraiser, agent, service provider, and the like. Graph server 140 may be a computer-based system including computer system components, desktop computers, workstations, tablets, hand held computing devices, memory devices, and/or internal network(s) connecting the components.

Network 130 may comprise any type of computer networking arrangement used to exchange data. For example, network 130 may be the Internet, a private data network, virtual private network using a public network, and/or other suitable connection(s) that enables system 100 to send and receive information between the components of system 100. Network 130 may also include a public switched telephone network ("PSTN") and/or a wireless network.

Network 130 may include a local network comprising any type of computer networking arrangement used to exchange data in a localized area, such as WiFi, Bluetooth™, Ethernet, and other suitable short-range connections that enable user device 120 to send and receive information between the components of system 100. In some embodiments, local network may be excluded, and user device 120 may communicate with system 100 components via the remainder of network 130. In some embodiments, user device 120 may communicate with one or more system 100 components via a direct wired or wireless connection.

Graph database 150 may store information in the form of a graph structure. Graph database 150 may be implemented using, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Figure 2:
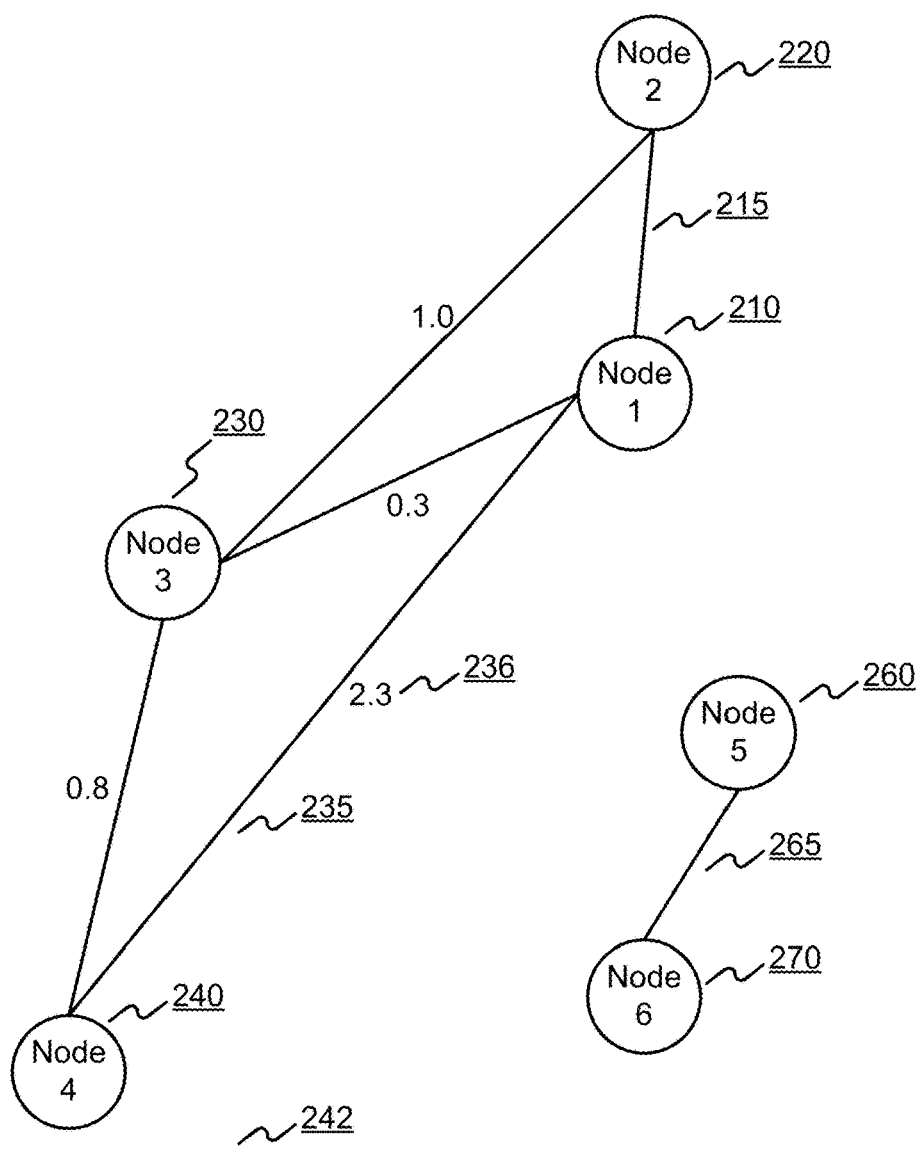
FIGS. 2-7 are functional block diagrams depicting exemplary aspects of some embodiments of the present disclosure.

FIGS. 2-7 are functional block diagrams depicting exemplary aspects of some embodiments of the present disclosure. With reference to FIG. 2, in some embodiments, a graph structure 200 implemented by system 100 may include node 1 (210), node 2 (220), node 3 (230), node 4 (240), node 5 (260), and node 6 (270). Such nodes may represent any combination of properties (e.g., real estate lots, homes, etc.), or any field, property, or value associated with such property nodes (e.g., appraisal value, last sale price, number of bedrooms, number of bathrooms, area, flags indicating whether the property is a corner property, waterfront property, one having a view, etc.), collectively referred to as "attributes." For example, the graph 200 may be generated using appraisal data, buyer information, seller information, mortgage insurer, servicer etc. For example, with reference to FIG. 7, in some embodiments, graph 200 may include nodes such as property nodes 1-3 (710, 720, 730), buyer node (740), servicer node (750) representing a service provider, a seller node (760), representing a seller, and/or the like. As discussed below, in some embodiments server 140 may aggregate these types of data by generating and transmitting queries to one or more networked or local databases associated with the respective data types, or to external systems maintained by government or private entities associated with the respective data types.

For example, by leveraging the data, properties and attributes, system 100 may identify comparable homes issued by appraisers as associations (edges) to build a graph data structure where the nodes are the properties or attributes, and edges (e.g., 215, 235, 265) exist between properties or attributes that are appraised as comparable ("comps") or related, with some particular weight or strength of relationship (e.g., 236). Each property node may store all relevant information 242 for the property such as Price, Number of bedrooms, Number of bathrooms, Square footage and other like data fields. Each edge can have a weight/score that determines how strong the similarity is between the two nodes that it connects. In some embodiments, this weight square can range from 0 to 1, and can take many factors into account such as the adjustments made on the appraisal, the freshness of the appraisal, etc.

Figure 3:
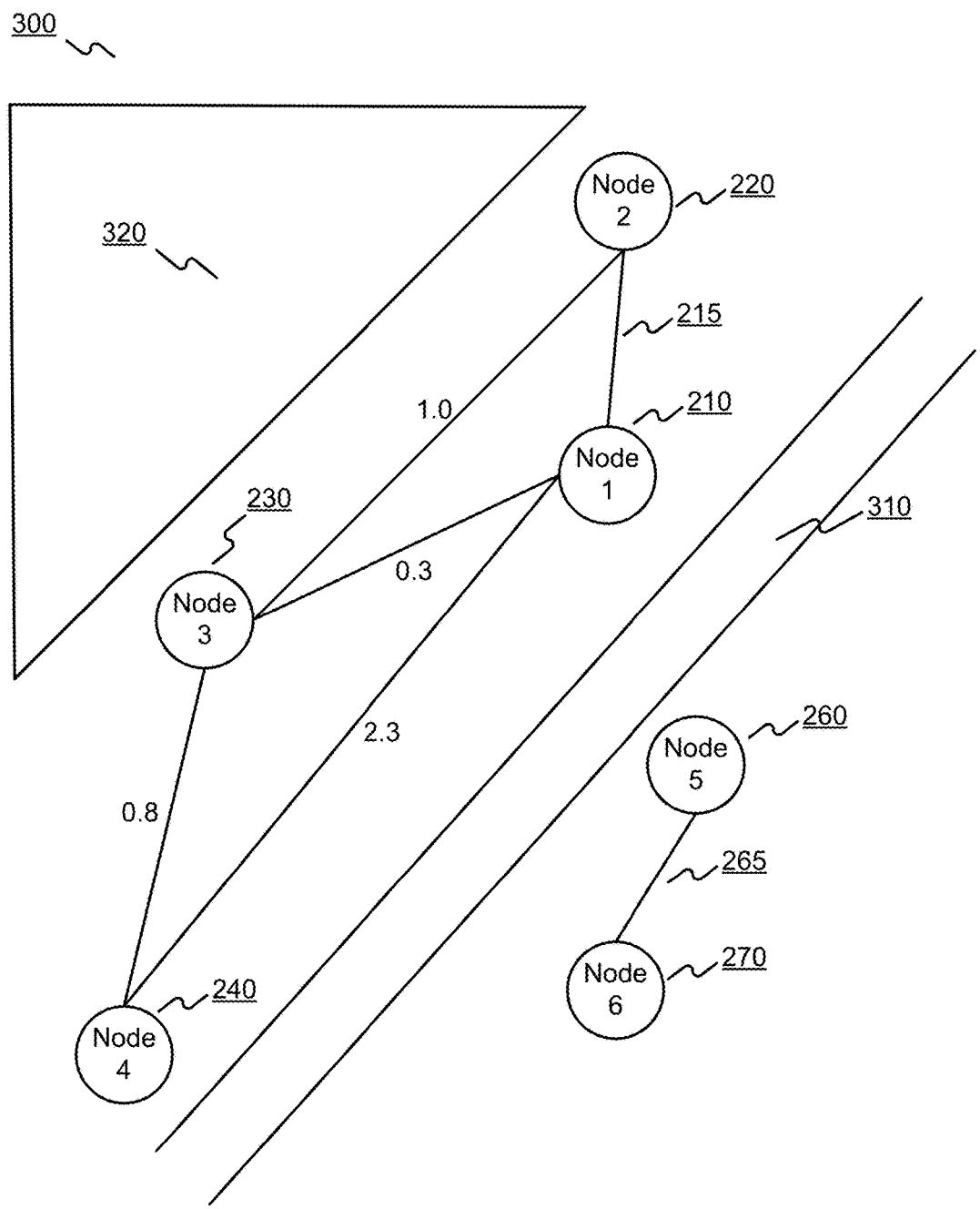

With reference to FIG. 3, in some embodiments, system 100 may perform neighborhood appraisal using the aforementioned graph structure. For example, nodes 1-4 (210, 220, 230, 240) may be considered waterfront properties due to their proximity to a water body 320. Nodes 1-4 (210, 220, 230, 240) may also be considered geographically adjacent to nodes 5-6 (260, 270). Nevertheless, nodes 1-4 (210, 220, 230, 240) may in fact be separated from nodes 5-6 (260, 270) by street 310, meaning that nodes 5-6 (260, 270) are not actually waterfront properties. Looking from a Euclidean distance perspective, conventional systems may assess that node 3 (230) has similar value to nodes 5 and 6 (260, 270) based on their proximity, because conventional systems may find it very difficult to programmatically detect differences in views and other abstract geographical boundaries such as school zones etc. However this assessment would be wrong. In some embodiments of the present disclosure, system 100 may employ graph clustering and network propagation algorithms to programmatically determine the correct neighborhood boundaries.

Figure 4:
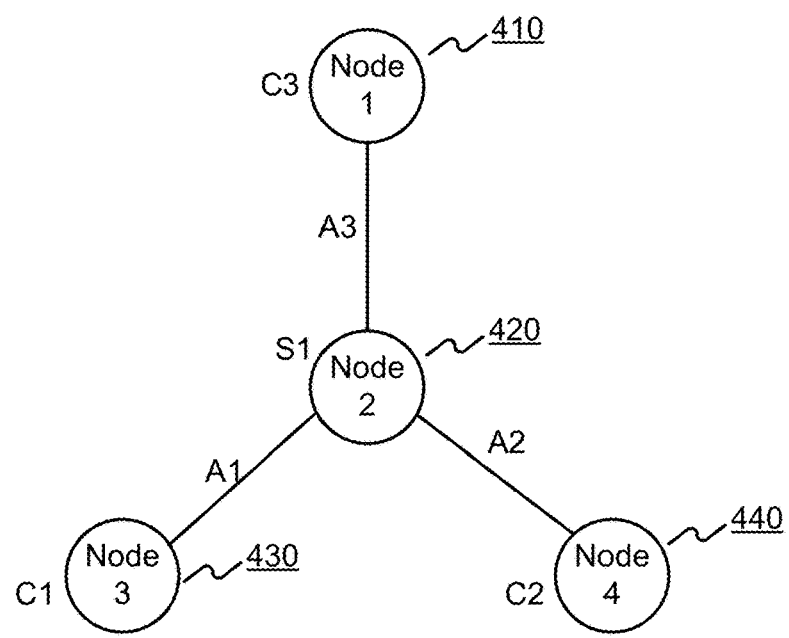

With reference to FIG. 4, in some embodiments, system 100, using the graph structure 200 stored in graph database 150, can develop novel methodologies for estimating the value of a given home. System 100 may use appraisal data to connect homes in the graph structure 200 using the following method. When an appraiser appraises home S1 (node 2, 420), he finds comparable homes C1 (node 3, 430), C2 (node 4, 440) and C3 (node 1, 410) that were recently sold. The system 100 may then apply adjustments A1, A2, A3 to the sale price of C1, C2, C3 respectively based on a set of conditions to compute a set estimate the value of S1 (node 2, 420):

$$S1_{value} \sim A1 \times C1_{value}, A2 \times C2_{value}, A3 \times C3_{value} \qquad (1)$$

This equation may also be rewritten as:

$$S1_{value}/A1 \sim C1_{value}, S1_{value}/A2 \sim C2_{value}, S1_{value}/A3 \sim C3_{value} \qquad (2)$$

The subjects S1 and their comps C1, C2, C3 can be added as nodes in the graph 200, and they may be connected by edges with weights that are the appraiser adjustments A1, A2, and A3, as shown in FIG. 4. Using these nodes and edges, system 100 can estimate a pricing distribution for each Node (home) by propagating the graph. For example, for the comparable home C2, system 100 can compute 3 pricing estimations p1, p2, p3 where:

$$p1 = \frac{S1_{value}}{A2}, \; p2 = \frac{C2_{value} \times A2}{A2}, \; p3 = \frac{C1_{value} \times A1}{A2}, \qquad (3)$$

All the homes in the graph structure 200 may be connected using, e.g., appraisal data, and thus system 100 can build a pricing distribution for all the homes through the connected nodes and their unique paths to the target node of interest.

Figure 5:
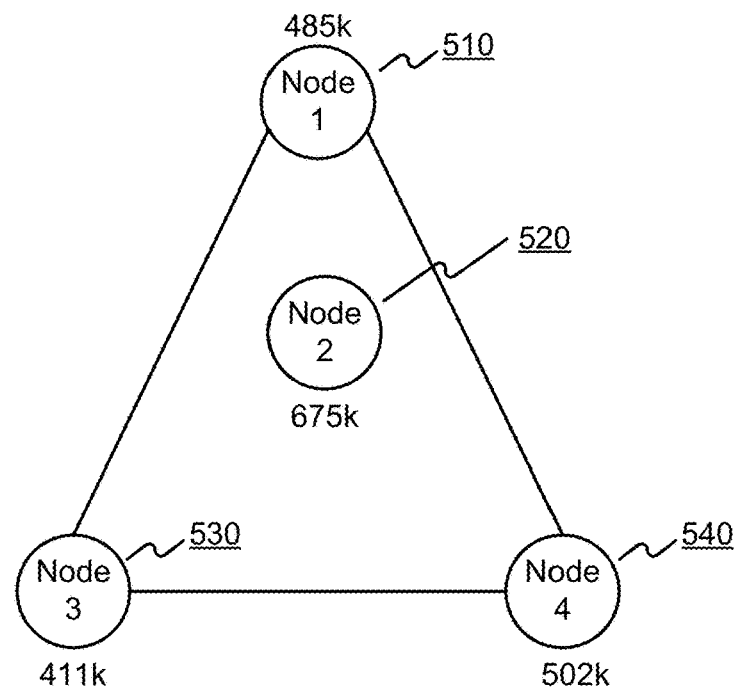
Figure 6:
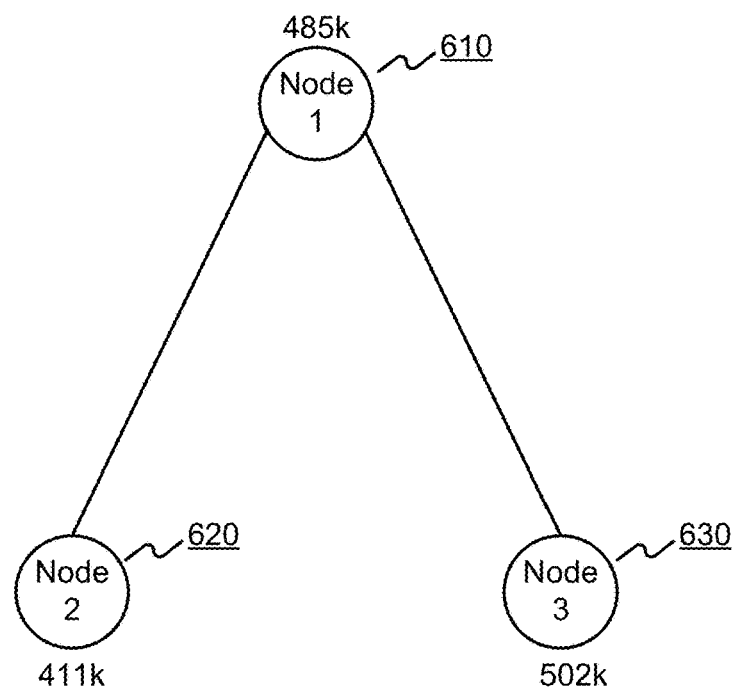
Figure 7:
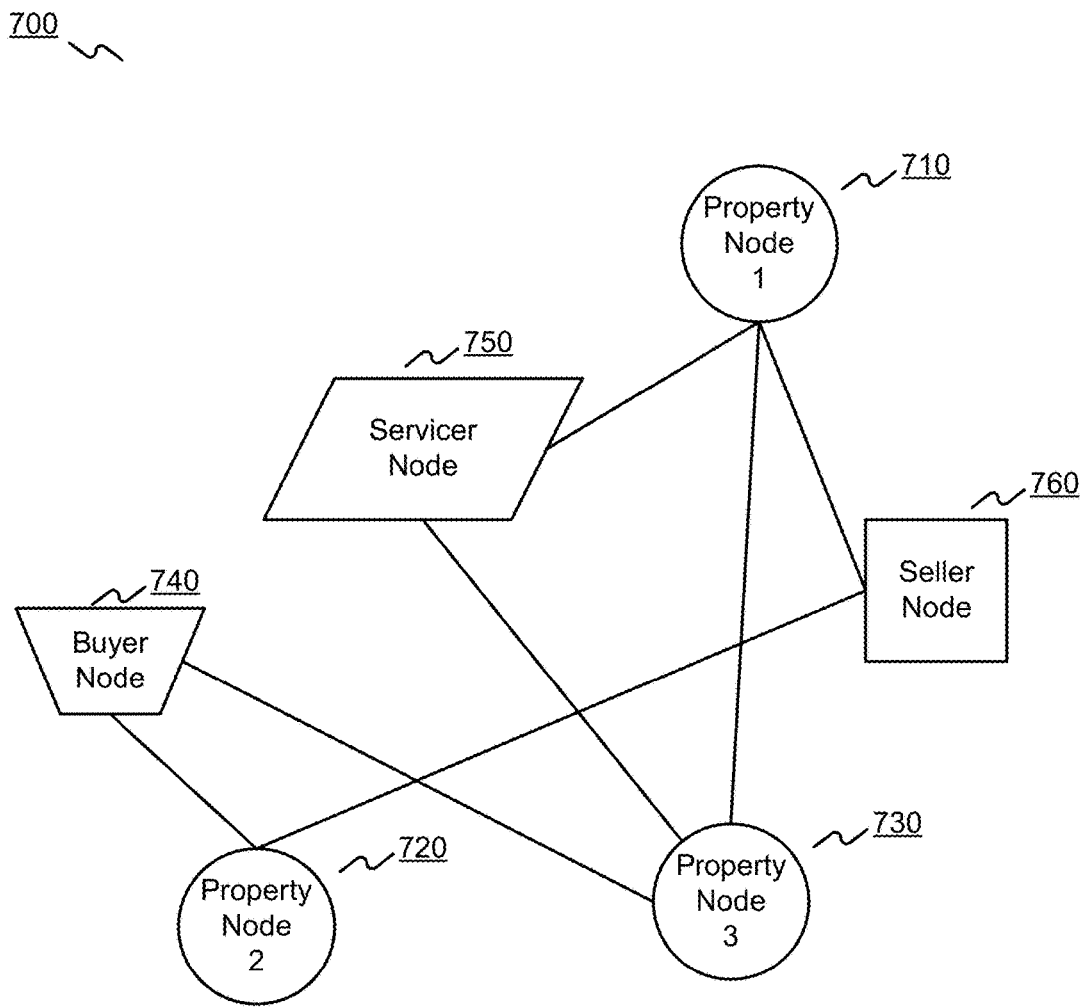

With reference to FIGS. 5 and 6, in some embodiments, system 100 may utilize graph traversing algorithms to detect anomalies such as in FIGS. 5 and 6 where the anomaly (node 2, 520) has a much higher value than the enclosing comps (nodes 1, 3, 4; 510, 530, and 540) for a subject appraisal (node 2, 520), or anomalous comps (node 2, 620, and node 3, 630) to a subject appraisal (node 1, 610) have no edges with them for N degrees of separation, where can be pre-determined by system 100 or a user 110. System 100 can also estimate the accuracy of an appraisal value by looking at where the appraisal value ranks in the Home Knowledge Graph Pricing Distribution computed for the property as described previously. The appraisals that fall in the tail end (under-valuation) or head (over-valuation) can be targeted for examination.

In general, it is to be understood that the computations using the graph data structure may be executed using big-data processing systems capable of performing parallel-processing of large-scale databases. Such processing systems may include distributed task processing systems that distribute processing across multiple cores of a computer, or across multiple computers. Examples of suitable big-data processing systems may include, for example, parallel computing clusters frameworks such as Hadoop, Apache™ Spark, or Hydra High Performance Computing (HPC). The results can then also be stored on the graph database 150 along with other information that users 110 can then query. For instance, all properties and their associated buyers, sellers, service providers, etc., can be loaded into graph database 150 so that users 110 can easily perform queries, such as who the buyer of a property is, what other homes did that buyer buy, and/or the like. Users 110 may utilize graph structure 200 that is saved on graph database 150 to perform complicated traversal algorithms (such as a home price estimation algorithm by linking homes together with appraisal data). Graph structure 200 may be mirrored, for example, onto a Hadoop Computer Cluster, and system 100 may use the power of parallel computing to perform the graph traversal algorithm and estimate the value of each property stored in graph database 150. Thus, graph database 150 may store the graph structure 200 with all of the different types of nodes and edges that users 110 can query, while any complex backend computation can be done by mirroring graph structure 200 onto, for example, a Hadoop computer cluster for computation. Graph database 150 may be enabled with functionality to connect with such computer clusters, for example running Hadoop.

Figure 8:
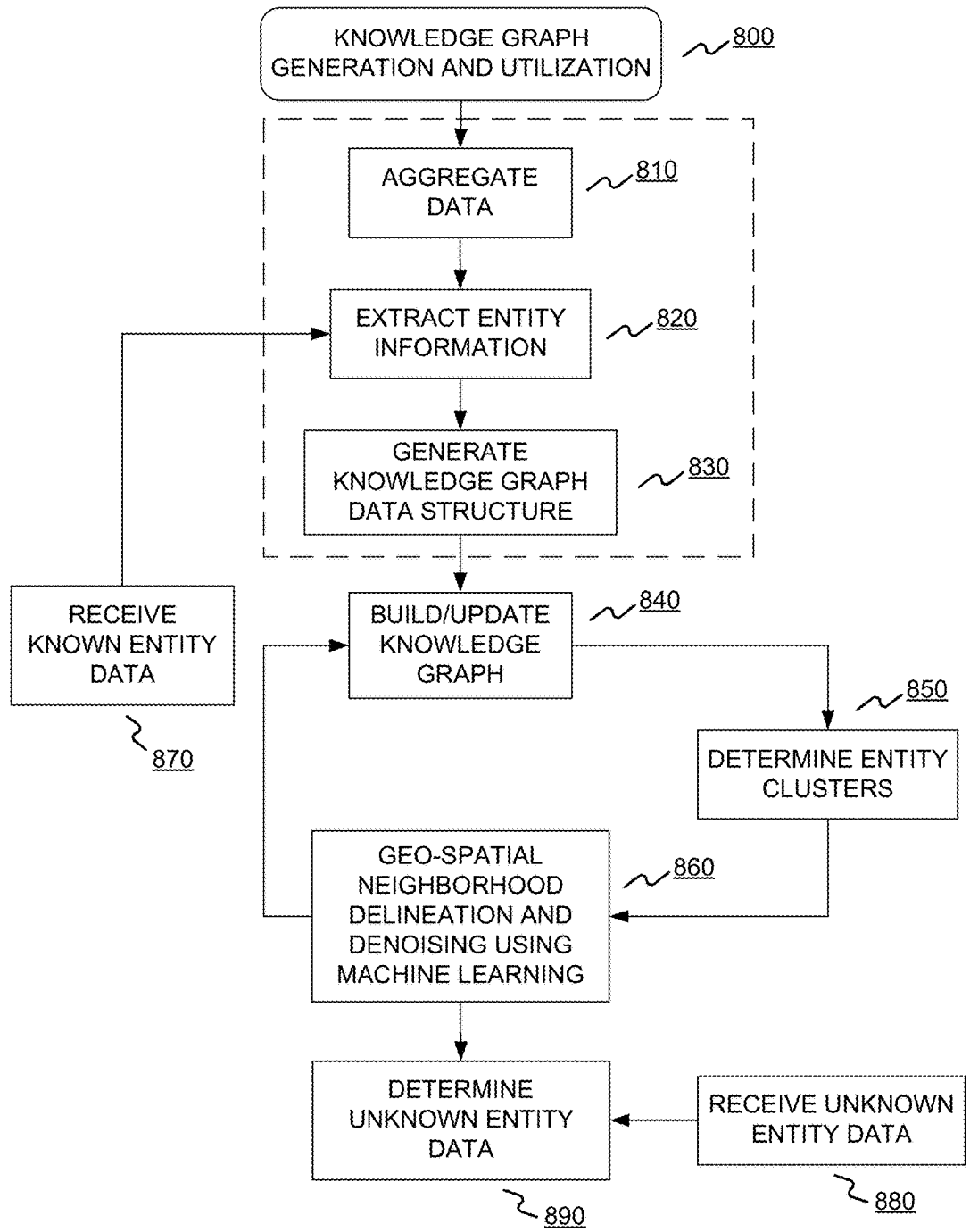
FIG. 8 shows a flowchart of an exemplary knowledge graph generation and utilization process, consistent with disclosed embodiments.

FIG. 8 shows a flowchart of an exemplary knowledge graph generation and utilization process 800, consistent with disclosed embodiments. In some embodiments, process 800 may be performed by a single computer system, such as a multicore processing system or a single cloud-based distributed computing service. In some embodiments, process 800 or portions thereof may be performed by a distributed computing system comprising multiple processing units associated with different server or cloud computing services. Those skilled in the art will appreciate that disclosed processes involve big data-scale data processing, and are suitable for implementation on computing systems capable of orchestrated parallel processing and/or simultaneous multi-threading. For discussion purposes, process 800 is discussed below as being implemented by graph server 140 (hereinafter "server 140").

Process 800 may comprise multiple stages including a first stage of aggregating data and building a knowledge graph, a second stage of utilizing the knowledge graph in one or more scenarios described herein, and a third stage of improving the knowledge graph through continuous data aggregation, knowledge graph updates, and machine learning-based "noise" reduction, all of which are discussed in further detail below.

In step 810, server 140 may aggregate data from one or more networked sources. The one or more networked sources may include one or more databases accessible via network 130, such as third party databases 160. In some embodiments, server 140 may query one or more local memories or databases such as graph databases 150. Server 140 may generate and send one or more query requests for data associated with desired nodes and edges for the knowledge graph, such as home appraisal data, home sale data, information about sellers, buyers, lenders, brokers, and any other entities to be included in the knowledge graph.

In step 820, server 140 may extract entity information from the aggregated data. Step 820 may involve organizing, tagging, and/or searching the aggregated data for identifying and extracting the entity information. Step 820 is discussed in more detail with respect to FIG. 9.

In step 830, server 140 may generate a knowledge graph data structure having the entity information extracted from step 820. As previously discussed, knowledge graph data structures differ from traditional relational databases, and provide the ability to store information representing complex relationships efficiently. Thus, the disclosed embodiments involve creating a new data structure using aggregated home data such as home appraisal data, which is received from traditional relational databases and converted to a format suitable for a knowledge graph database. The generated knowledge graph data structure may be stored in a local memory such as graph DB(s) 150, or stored remotely via network 130.

In step 840, server 140 may build or update a home knowledge graph using the generated data structure. Server 140 may use one or more known knowledge graph bases to generate a knowledge graph using entity and relationship information stored in the knowledge graph data structure.

In step 850, server 140 may determine one or more entity clusters in the knowledge graph. As discussed herein, entity clusters are groups of entities in the knowledge graph that are associated by a threshold level of similarity and/or a threshold proximity to one another in the knowledge graph. Thus, entity clusters may refer to neighborhoods of homes in the knowledge graph. Step 850 is discussed in more detail focusing on the clustering of property nodes to identify neighborhoods with respect to FIG. 10.

In step 860, server 140 may perform machine learning-based classification to perform geo-spatial neighborhood delineation and de-noising. In some embodiments, a machine learner may classify a property's neighborhood membership, given its longitude and latitude. The algorithm may also prune "noisy" or spurious clusters through generalization during classification training. Step 860 is discussed in more detail with respect to FIG. 12. Following step 860, process 800 may return to step 840, in which server 140 may use the machine learning analysis data to update the knowledge graph, such as by changing an identified neighborhood for one or more homes (entities/nodes) in the knowledge graph. In some embodiments, server 800 may also update the knowledge graph data structure based on the machine learning analysis (not shown in FIG. 8).

In step 870, server 140 may receive known entity data for an additional home not included in the knowledge graph. For example, server 140 may receive data for a new appraisal for a home in the knowledge graph, or a new appraisal for a home that is not yet included in the knowledge graph. The entity data may be considered "known" if the appraisal data includes a threshold amount of information describing the value of the home, its attributes, and its comps. Server 140 may receive such data by periodically querying one or more databases, or by receiving automated or scheduled updates in appraisal data, similar to step 810. Server 140 may proceed to extract entity information (step 820), and generate an updated knowledge graph data structure (step 830) and updated knowledge graph (step 840).

In step 880, server 140 may receive unknown entity data, which may include home appraisal data that is below a predetermined threshold amount of information about the home, its value, and/or its comps. For example, if a predetermined threshold rule of 3 comps is set, then server 140 may deem any home appraisal data having only 2 comps to be "unknown" entity data.

In step 890, server 140 may generate and execute one or more queries to traverse the home knowledge graph, to determine unknown entity data. For example, if the received appraisal data includes a number of comps below a threshold level, then server 140 may use the home knowledge graph neighborhood delineation machine learning classifier and the corresponding Hierarchical Cluster Tree Structure to provide the unknown entity with corresponding comps from the Home Knowledge Graph data structure that belong in the same neighborhood.

Figure 9:
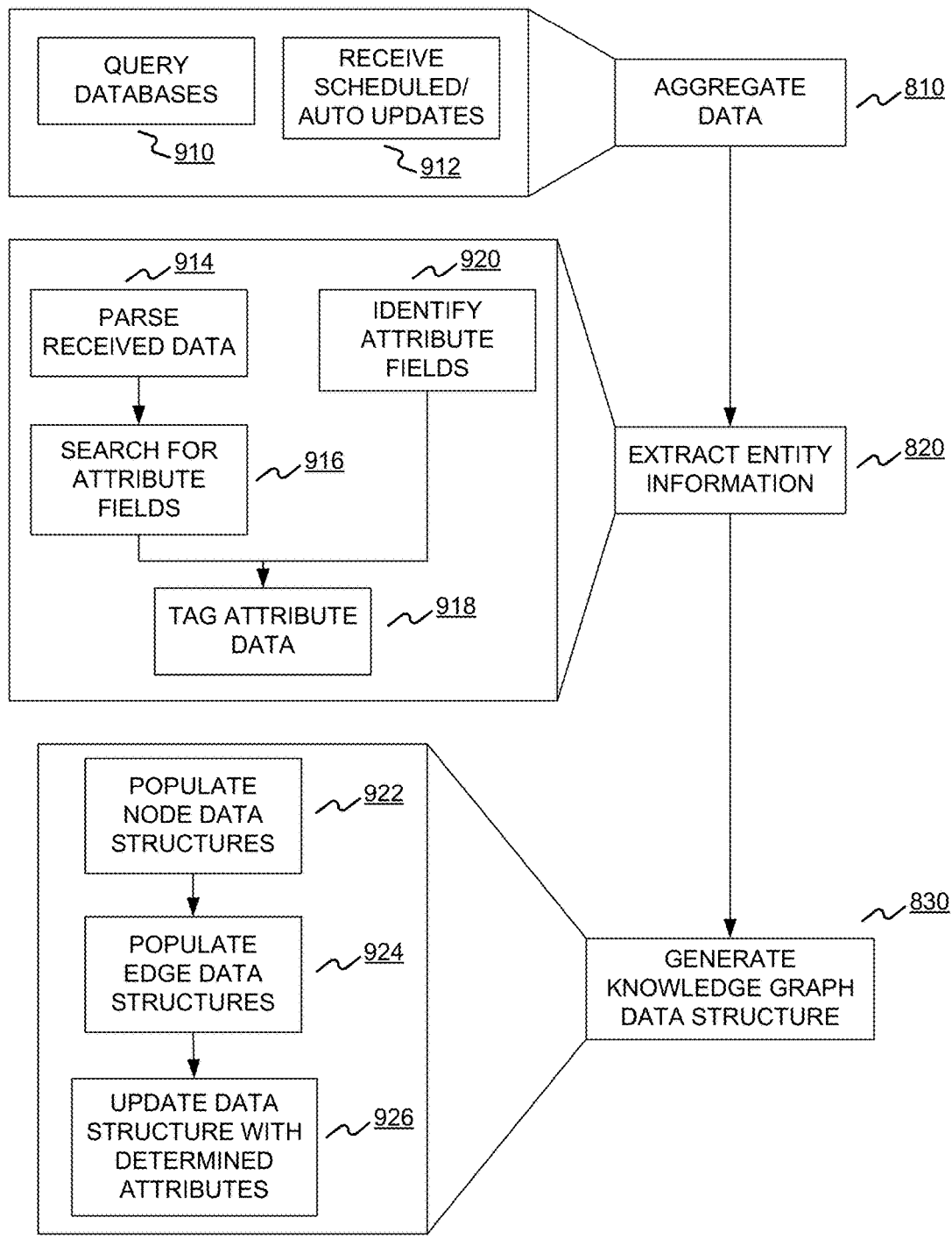
FIG. 9 shows a flowchart of an exemplary data aggregation, entity information extraction, and knowledge graph data structure generation subroutine, consistent with disclosed embodiments.

FIG. 9 shows a flowchart of exemplary subroutine for aggregating data (step 810), extracting entity information (step 820), and generating knowledge graph data structures (step 830), consistent with disclosed embodiments.

In some embodiments, data aggregation step 810 may comprise querying databases 910 and/or receiving scheduled or automatic updates 912. As previously discussed, server 140 may generate and send one or more query requests for entity data such as appraisal data to one or more connected databases (step 910), if server 140 is configured to "pull" entity data. In some embodiments, server 140 may be configured to receive "push" updates from associated databases, and may receive scheduled or automated updates of appraisal data.

In some embodiments, entity information extraction step 820 may comprise a subroutine including some or all of steps 914-920. Received appraisal data may be structured or unstructured. Structured data may identify one or more fields in the data, and the associated values for each given field. Unstructured data may take the form of a string of parameters and values that have little or no identifiable fields.

Steps 914 and 916 may address entity information extraction for unstructured data. In step 914, server 140 may parse the received data using a static or dynamic n-gram parsing scheme, or by detecting spaces or characters in the data that separate values in the data. In step 916, server 140 may search the parsed data for attribute fields. In some embodiments, the parsed data may identify attribute fields, such as by including one or more labels next to the associated values in the appraisal data. In other embodiments, server 140 may search the parsed data for predetermined value formats or ranges of values, and categorize values with predetermined attribute fields. For example, server 140 may employ one or more rules for identifying address information in parsed data, by searching the parsed data for a predetermined format of [house number] [street name] [road label (st/rd./ln./pl./ave., etc.)].

In step 918, server 140 may tag attribute data with identified attribute fields, to create structured data from the unstructured received appraisal data. In some embodiments, appraisal data may be tagged using metadata tags. In some embodiments, server 140 may create a temporary relational table entry having the tagged data.

In some situations, server 140 may receive structured appraisal data, in which the values are already associated with identified attribute fields. For example, server 140 may receive appraisal data that is structured in a relational table. In step 920, server 140 may identify the attribute fields in the structured data. Server 140 may normalize the attribute fields by converting an uncommon attribute field to a predefined attribute field (not shown in figure). For example, server 140 may employ one or more rule sets or lookup tables for identifying a normalized attribute field associated with the identified attribute field, to result in appraisal data that is directly comparable to other appraisal data in the knowledge graph data structure. Server 140 may then tag the appraisal data with the appropriate attribute tags (step 918).

In some embodiments, server 140 may generate knowledge graph data structures (step 830) using a subroutine including some or all of steps 922-926. In step 922, server 140 may populate node data structures in a knowledge graph base by inserting tagged data into appropriate fields in the graph base. For example, server 140 may store known entity information in home appraisal data by storing the attribute fields and associated values in a knowledge graph data structure.

In step 924, server 140 may populate edge data structures in the knowledge graph base, by inserting tagged or determined data into appropriate fields in the graph base. In some embodiments, edge data structures may include information such as edge weights between any two given nodes, such as a home and a comp. In some embodiments, edge weights may be extracted from the appraisal data, and in some embodiments edge weights may be calculated based on information in the appraisal data.

In step 926, server 140 may update the data structure with determined attributes. In some embodiments, determined attributes may include information about an entity that is determined using the knowledge graph, as opposed to data received with the aggregated appraisal data. Such information may include, for example, additional comps that were not included in the original appraisal data, new determined relationships to other homes, data about the home exterior or property data received from one or more geospatial map databases, and additional attributes input by one or more users. After populating and updating the knowledge graph data structures for all known entities, server 140 may proceed to generate or update the home knowledge graph (step 840 of FIG. 8).

Figure 10A:
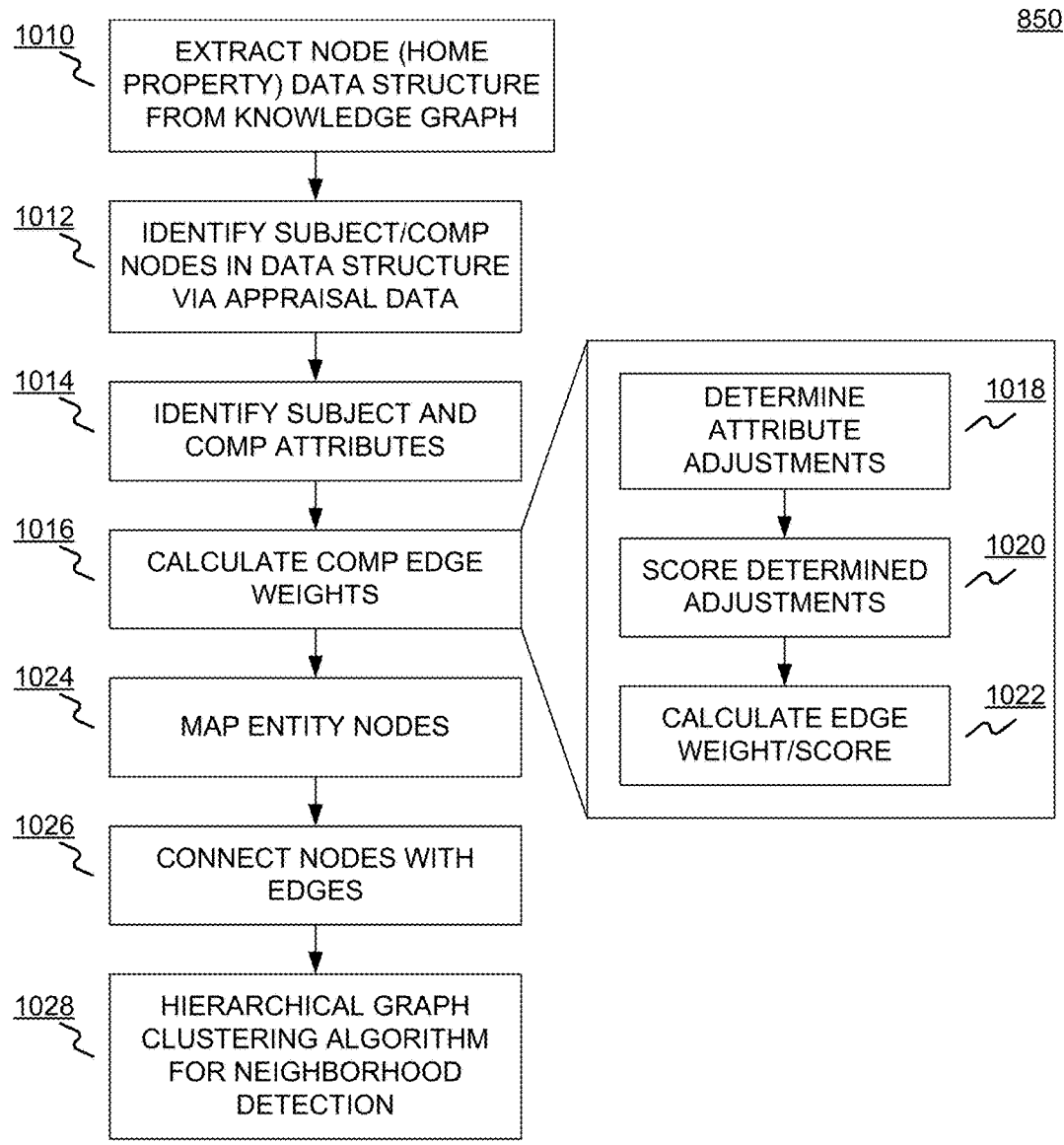
FIG. 10A shows a flowchart of an exemplary subroutine for determining entity clusters, consistent with disclosed embodiments.

FIG. 10A shows a flowchart of an exemplary subroutine for determining entity clusters (step 850 of FIG. 8), consistent with disclosed embodiments. In some embodiments, some steps of FIG. 10A may be performed during step 840 of process 800.

FIG. 10A details an example of how the disclosed embodiments process appraisal data using knowledge graph technology in a manner not previously implemented in property valuation industries, to define accurate neighborhoods having strong comparable homes. Determining more accurate neighborhood boundaries and areas may improve upon current home valuation systems, by providing information about average home values in a given region that is more accurate than traditional zip code or county-based systems. The use of knowledge graph data structures disclosed herein may enable the determination of complex relationships between homes necessary for generating and utilizing the home knowledge graph.

In step 1010, server 140 may extract a node data structure (such as home property data) from the knowledge graph. For example, server 140 may process an entry in the knowledge graph data structure for a particular home, including all appraisal data available for that home. The appraisal data in the data structure may include a plurality of comps, or comparable homes used to create the appraisal.

In step 1012, server 140 may identify subjects, or comparison nodes, stored in data structure for the home, by searching appraisal data stored in the node data structure for identified comps. In step 1014, server 140 may identify attributes for the home and the comps. Server 140 may read the tagged data stored in the knowledge graph data structure to identify the attributes associated with the home and the comps. The attributes may have an associated adjustment value, indicating a home value difference between the home and a given comp, based on a particular attribute. For example, the subject home may have 4 bedrooms, and a first comp in the appraisal data may have 3 bedrooms. The appraisal data may indicate that this attribute is associated with a +$4000 adjustment, because the 4 bedroom home was determined by the appraiser to be worth $4000 more than the 3 bedroom comp home based on the number of bedrooms. As another example, a second comp home having 5 bedrooms may be associated with a −$3000 adjustment, if the appraiser determined that the 4 bedroom home was worth $3000 less than the 5 bedroom comp home, based on the number of bedrooms. In some embodiments, adjustment data may be represented as a multiplier value, rather than a dollar value. In other embodiments, server 140 may calculate a multiplier value by dividing a home value by the comp home value, for one or more attributes, or for the entire home value.

In step 1016, server 140 may calculate comp edge weights for the edges connecting the home and its comps in the knowledge graph. Step 1016 is discussed in further detail below.

In step 1024, server 140 may map the entity nodes in the knowledge graph. Server 140 may read location data in the knowledge graph data structure, such as a street address or latitude/longitude coordinates for the home, and determine spatial relationships between home entities based on geographical location. An example of mapped nodes and edges is shown in FIG. 2.

In step 1026, server 140 may connect entity nodes using edges. Edges may represent a relationship between an entity and its comps as indicated in the appraisal data. The edge may have an associated value that is directly proportional to the degree of similarity between the entity home and a given comp. In some embodiments, the edge value may fall within a predetermined range, such as 1-10 or 0.1-1, where the upper limit may represent the strongest relative similarity between entities in the knowledge graph, and the lower limit may represent the weakest relative similarity between entities in the knowledge graph. In some embodiments, server 140 may normalize all edge values before generating or updating the knowledge graph, to determine normalized edge values that are relative to all other edge values in the knowledge graph.

In step 1028, server 140 may identify or partition nodes into clusters based on the graph topology (e.g., the edge connections in the graph data structure.) For the exemplary use case of neighborhood delineation, step 1028 may implement a hierarchical graph clustering algorithm to learn a hierarchical cluster tree structure that starts at a base level (such as at the county level for this example), and partitions the home nodes into smaller and smaller clusters (neighborhoods) that may be used instead of zip codes for various modeling needs. Neighborhoods learned using this technique may be more uniform compared to computer systems using traditional zip codes, MSA codes etc. Step 1028 is described in more detail with respect to FIG. 10B

Returning to step 1016, in some embodiments, server 140 may calculate comp edge weights by performing one or more of substeps 1018-1020. In step 1018, server 140 may determine attribute adjustments between a home entity and a given comp. The attribute adjustments may be stored in the knowledge graph data structure as being received in the appraisal data, or may be determined by server 140. For example, server 140 may determine an appraisal adjustment value by dividing a home price adjustment associated with the comp and attribute by the home value, to determine a multiplier value corresponding to the adjustment. In some embodiments, server 140 may utilize only the net adjustment between a home and comp, representing the total value adjustment in the appraisal. In other embodiments, server 140 may utilize individual adjustments corresponding to different attributes, and groups of adjustments defined in one or more rule sets of knowledge graph queries.

In step 1020, server 140 may score the determined adjustments. In some embodiments, server 140 may apply a weight to certain attribute adjustments, to normalize the adjustments or to prioritize certain attribute adjustments over others. For example, an attribute adjustment associated with a number of bedrooms may be assigned a higher weight than an attribute adjustment associated with a number of fireplaces. The attribute adjustment weights may be received as part of a knowledge graph traversal query, or predefined and stored in one or more databases. Furthermore, attribute adjustment weights may be adjusted for different geographical locations. Following the example above, a number of bedrooms may be weighted heavily against a number of fireplaces in a warm geographical location, but the two attributes may be assigned the same weighting in a colder region where fireplaces are more desirable. The weighting values may be predetermined and stored, or may be dynamically determined and updated using machine learning techniques.

In step 1022, server 140 may calculate an edge weight/score for a knowledge graph edge connecting a home entity node and a particular comp. The edge weight may comprise a score that is based on a net adjustment value for a given comp in the stored appraisal data. In some embodiments, the edge weight may be determined based on a combination of weighted attribute adjustments, or a weighted/normalized net adjustment.

Figure 10B:
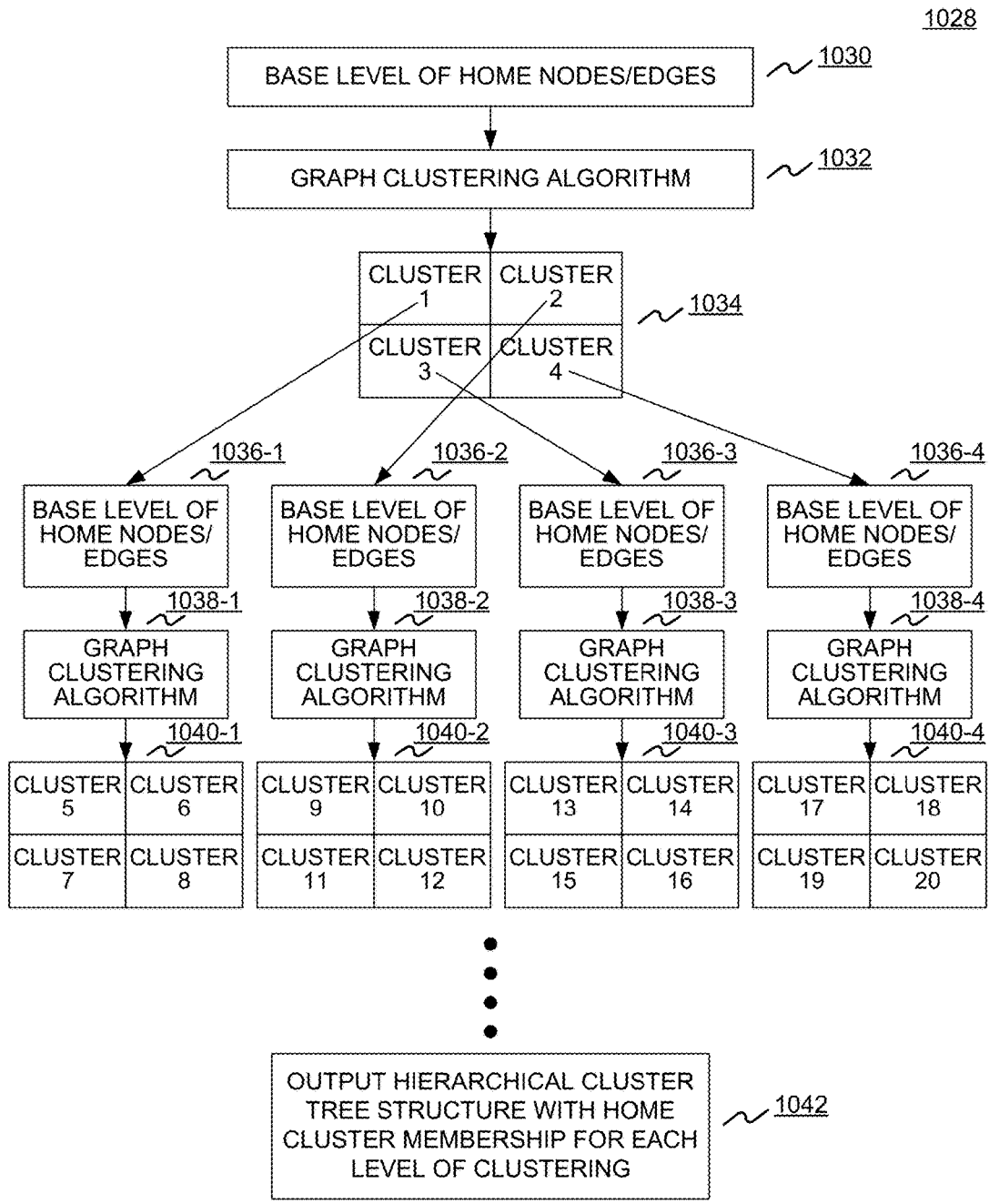
FIG. 10B shows a flowchart of an exemplary subroutine for generating a hierarchical cluster tree structure, consistent with disclosed embodiments.

FIG. 10B shows a flowchart of an exemplary subroutine for generating a hierarchical cluster tree structure, consistent with disclosed embodiments. The subroutine may correspond to step 1028 of FIG. 10A.

In step 1030, server 140 may determine a base level of home nodes and edges between homes.

In step 1032, server 140 may employ a graph clustering algorithm to identify home node clusters corresponding to the base level. Examples of substeps associated with step 1032 are discussed below with respect to FIG. 10C.

In step 1034, server 140 may identify a plurality of clusters associated with the base level, based on the graph clustering algorithm. In the example shown, clusters 1-4 are identified at step 1034. Thus, server 140 may identify four clusters of similar homes located within a certain geographical area such as a county. Server 140 may store an identification of each cluster for the first level of clusters (not shown in figure).

In step 1036, server 140 may identify a base level of home nodes and edges for each of clusters 1-4, shown as steps 1036-1 to 1036-4. Step 1036 may be similar to step 1030.

In step 1038, server 140 may execute the graph clustering algorithm for each of clusters 1-4, shown in FIG. 10B as 1038-1 to 1038-4. In some embodiments, server 140 may use the same graph clustering algorithm as step 1032. In other embodiments, server 140 may employ a graph clustering algorithm that is modified for the particular level of detail, such as a modified algorithm that requires greater similarity between homes to identify clusters, as opposed to the graph clustering algorithm employed in step 1032. In the example shown, clusters 1-4 are each divided into four subclusters, representing smaller clusters (neighborhoods) with increased levels of similarity within the county.

Server 140 may continue executing the graph clustering algorithm to identify additional cluster levels (not shown in figure). Once complete, in step 1042 server 140 may output a data structure having the hierarchical cluster tree structure, with home cluster membership identification labels for each level of clustering. Cluster membership identification labels may be stored in the data structure for each home node.

Alternatively, in some embodiments the graph data structure may include a data structure for each cluster at least level of the tree, each data structure identifying the member nodes.

Figure 10C:
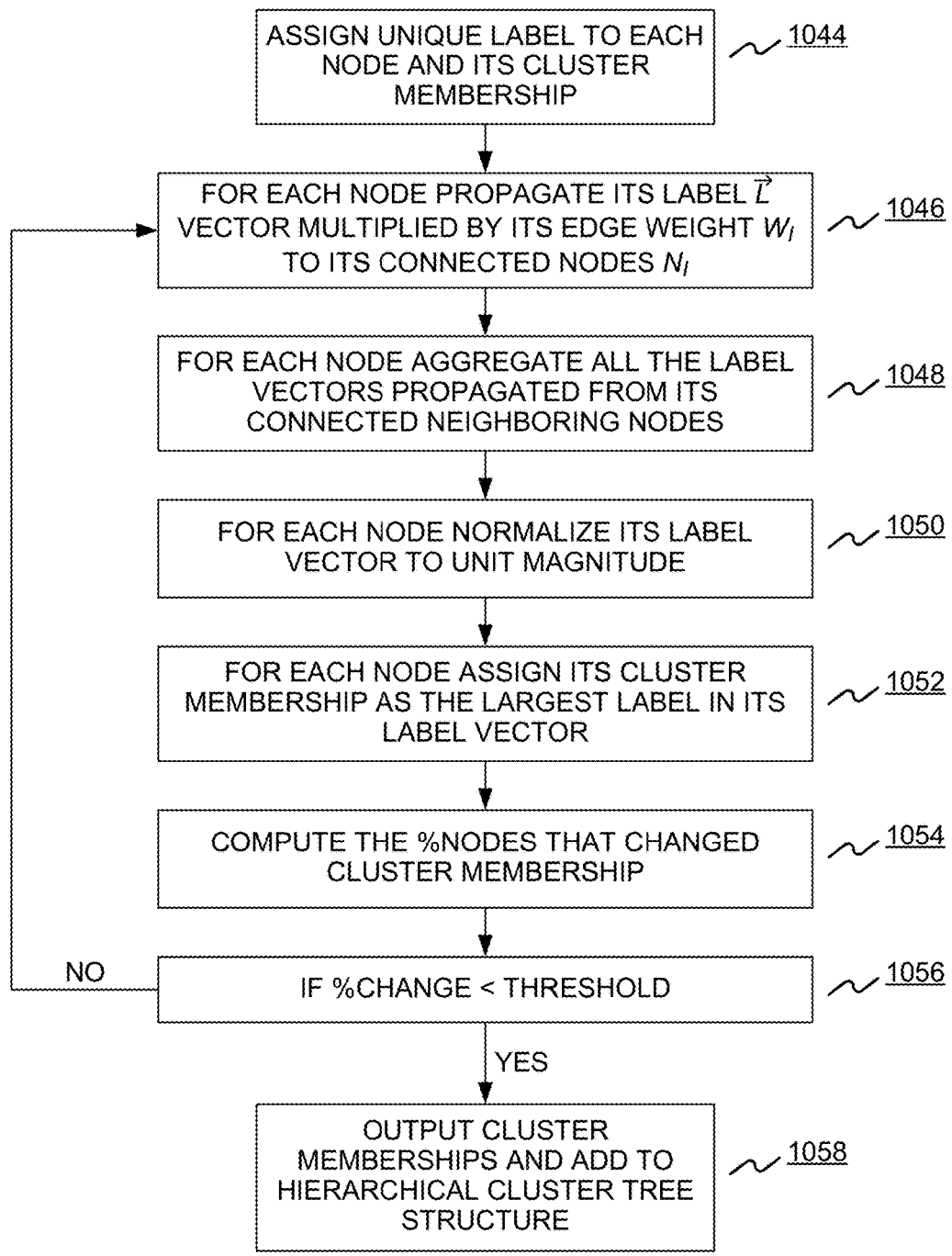
FIG. 10C shows a flowchart of an exemplary subroutine for a graph clustering algorithm, consistent with disclosed embodiments.

FIG. 10C shows a flowchart of an exemplary subroutine for a graph clustering algorithm, consistent with disclosed embodiments.

In step 1044, server 140 may assign a unique label to each node and its cluster membership.

In step 1046, server 140 may propagate the unique label for each node. The propagated information may include the node label vector multiplied by its edge weight to connected comp nodes.

In step 1048, server 140 may aggregate, for each node, all of the label vectors propagated by the connected comp nodes.

In step 1050, server 140 may normalize the label vector to a unit magnitude, for each of the nodes.

In step 1052, server 140 may assign a cluster membership of each node as the largest label in its label vector.

In step 1054, server 140 may compute an amount of nodes that have changed cluster membership, such as a percentage of nodes that changed from a first membership to a second membership.

In step 1056, server 140 may determine whether a predetermined threshold of node changes is surpassed. For example, server 140 may determine whether the computed percentage of changed nodes is beneath a predetermined threshold. If the percentage change is beneath the threshold ("Yes" in step 1056, then in step 1058 server 140 may output the cluster memberships, and add the memberships to the hierarchical cluster tree structure. If the percentage of changed clusters exceeds the predetermined threshold ("No" in step 1056), then subroutine 1032 may return to step 1046.

Figure 11A:
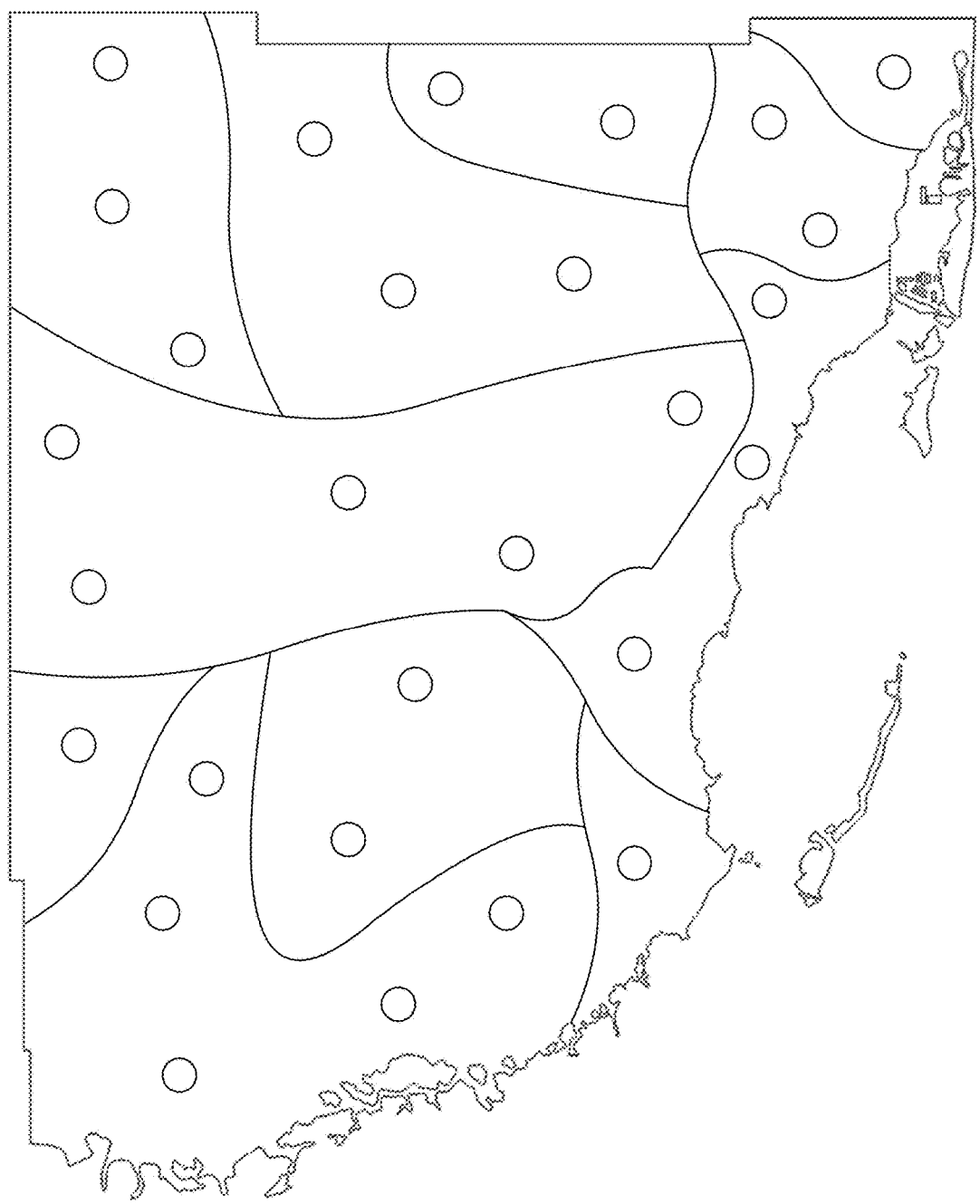
FIGS. 11A-11D illustrate exemplary cluster diagrams, consistent with disclosed embodiments.

FIGS. 11A-11D illustrate exemplary cluster diagrams, consistent with disclosed embodiments. FIG. 11A shows an example of a first cluster diagram generated using a home knowledge graph consistent with disclosed embodiments. Different colored regions may identify different clusters in the geographical region. As shown, the diagram includes more than a dozen different clusters, representing different neighborhoods of similar homes having comparable values. Using traditional systems that apply average home values for a zip code or defined subdivision, the same diagram may include only 1-4 different clusters, due to the few subdivisions within the county. However, conventional systems would produce very inaccurate home values, because the same county may include different population densities ranging from high-density urban areas to low-density rural areas. Furthermore, conventional systems are not capable of performing the clustering processes disclosed herein, because traditional systems are based upon relational databases such as basic matrices and lookup tables that are incapable of storing data for complex relationships between entities, and in formats that can be processed efficiently at the scale required for analyzing even relatively small geographic regions. Furthermore, traditional clustering algorithms rely on descriptive features such as number of bedrooms, bathrooms etc. There are many subjective features, such as the feel of the neighborhood, etc., that cannot be described using traditional home data, and traditional clustering algorithms are extremely sensitive to the features value range. To provide more accurate results than traditional systems, disclosed embodiments store data regarding subjective aspects from all the past appraisers for a given property in a graph data structure, and use graph clustering algorithms to identify neighborhoods that cannot be determined using traditional computer systems and techniques.

Figure 11B:
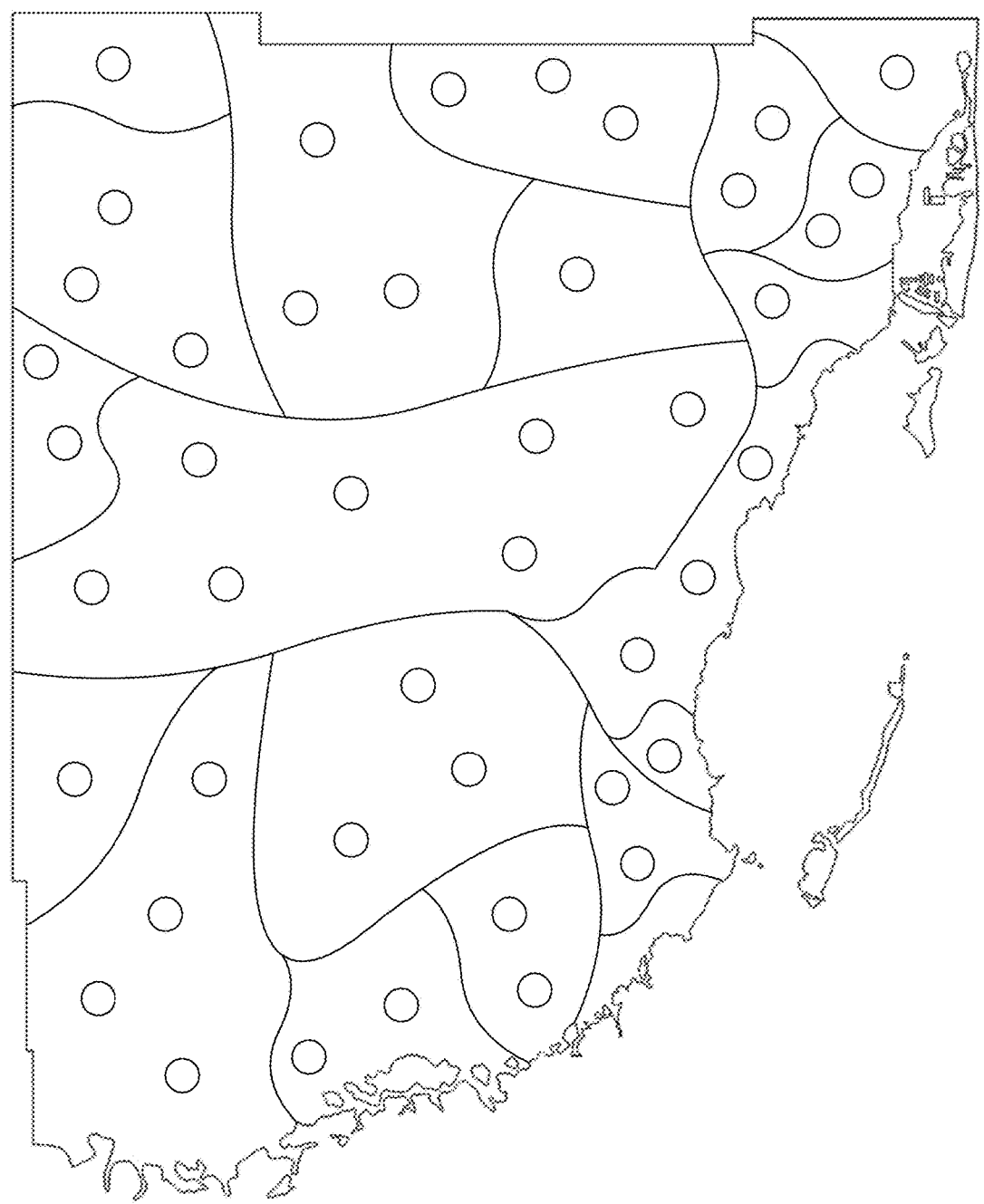

FIG. 11B is an example of a second cluster level generated by the Hierarchical clustering algorithm of the disclosed embodiments, demonstrating an iterative level of clustering resulting in smaller clusters/neighborhoods of greater similarity. In the example shown, server 140 may employ more stringent optimization criterion during clustering within each individual cluster from the previous clustering level. As shown, clusters that were larger in FIG. 11A are now divided into smaller subclusters, representing smaller groups of homes that are more closely related.

Figure 11C:
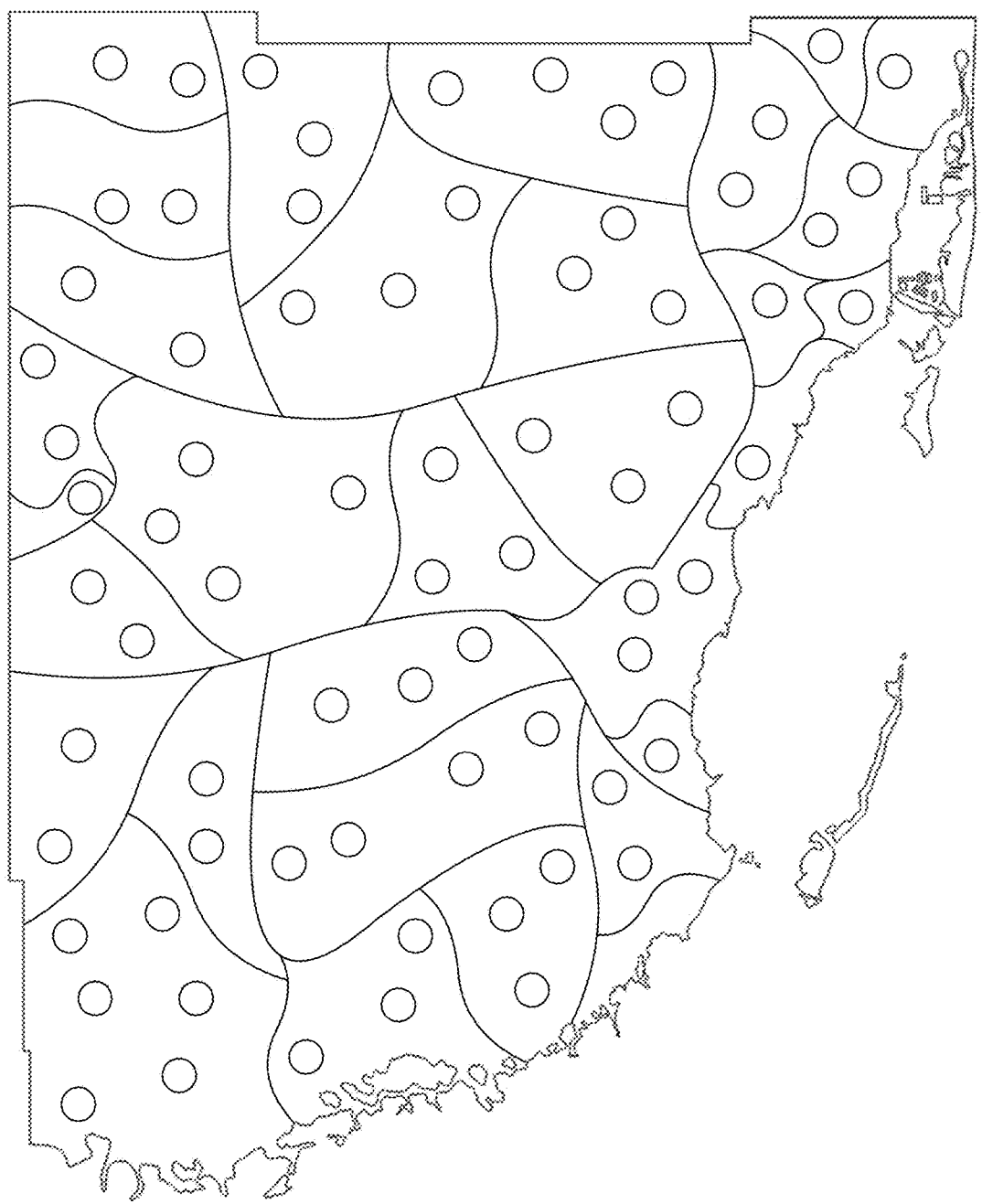
Figure 11D:
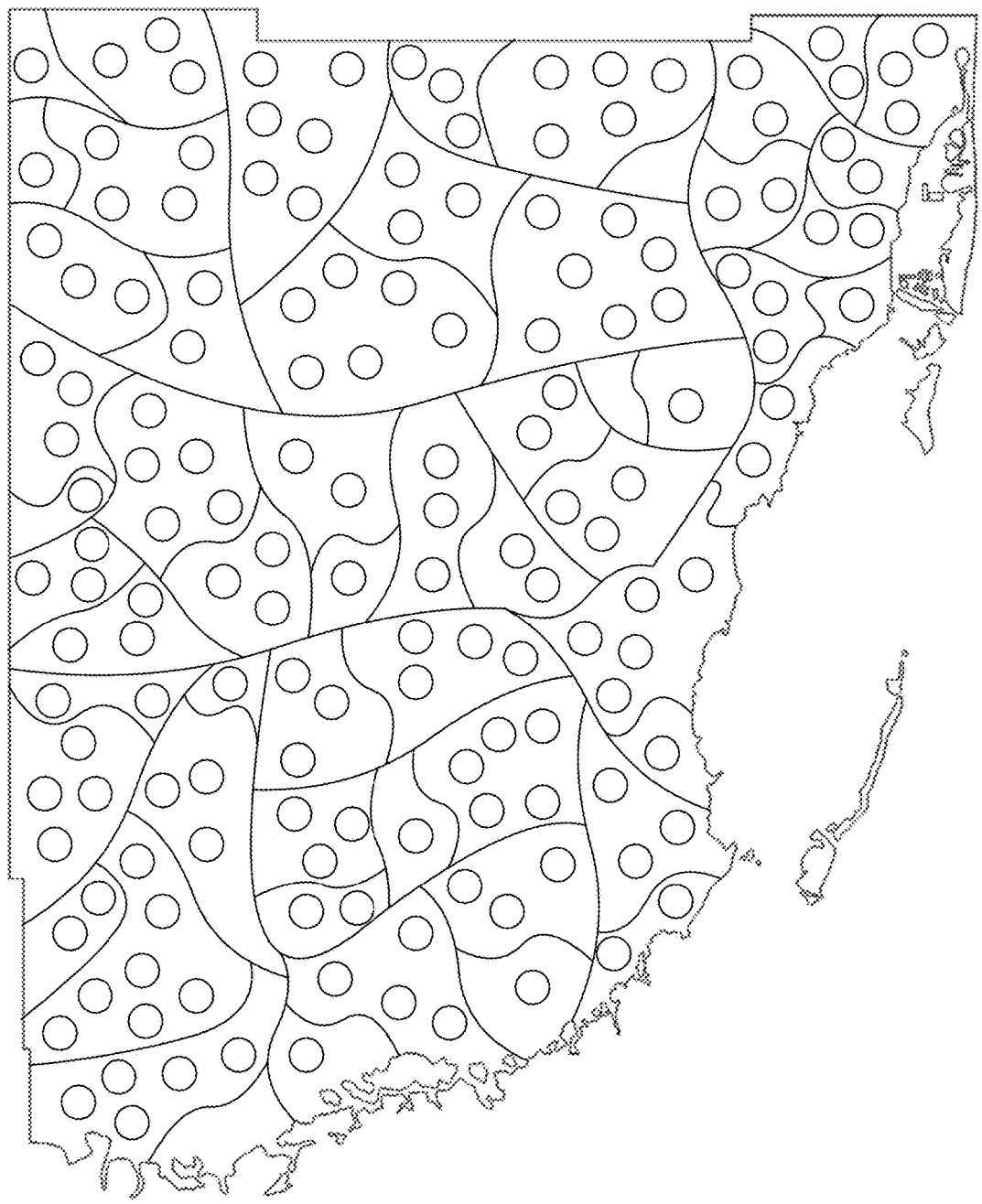

FIGS. 11C and 11D demonstrates additional Hierarchical levels of clustering resulting in increasingly finer cluster/neighborhoods. Using the disclosed embodiments, neighborhoods may be accurately defined using graph clustering (network detection) analyses of home appraisal data stored in a knowledge graph data structure, rather than arbitrary regional boundaries and subdivisions that may not accurately represent areas of comparable home values.

The boundaries of defined clusters and subclusters may be learned and stored in a database and imported for use in a home value estimation system, in place of traditional boundaries defined by zip code and political boundaries. For example, home value estimation computer systems may estimate a target home value by determining the average home value of a cluster where the target home is located. In contrast, traditional systems utilize the average home values of a zip code or subdivision, which can be arbitrary and have average home values that misrepresent the localized area of the target home. Thus, the disclosed embodiments generate new data that may be used to improve the efficiency and accuracy of other computer systems used in home valuation technologies.

Figure 12:
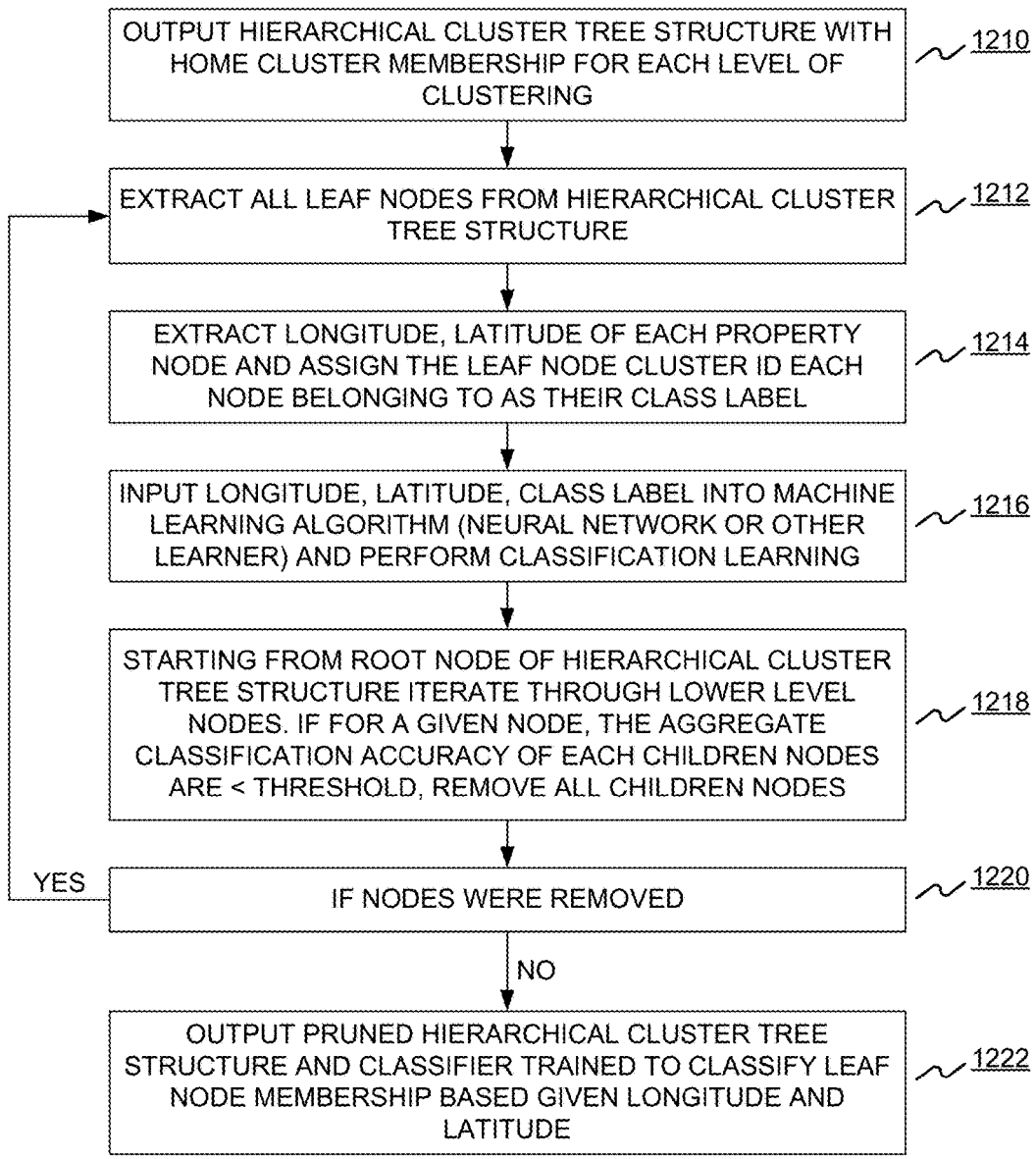
FIG. 12 shows a flowchart of an exemplary subroutine for geo-spatial neighborhood delineation and denoising using machine learning, consistent with disclosed embodiments.

FIG. 12 shows a flowchart of an exemplary subroutine for geo-spatial neighborhood delineation and denoising using machine learning (corresponding to step 860 of FIG. 8). In some embodiments, a machine learner may be trained for determining a property's neighborhood based on its location (longitude, latitude). In some embodiments, the machine learning algorithm may learn the boundaries that define each neighborhood using techniques disclosed herein. Step 860 also has an added benefit of removing noisy/spurious neighborhoods through generalization during training of the machine learning algorithm.

In step 1210, server 140 may output a hierarchical cluster tree structure with home cluster memberships (e.g. neighborhoods) identified for each level of clustering. Step 1210 may correspond to step 1042 of FIG. 10B.

In step 1212, server 140 may extract all leaf nodes from the hierarchical cluster tree structure.

In step 1214, server 140 may extract longitude and latitude data of each property node, and assign the leaf node cluster ID belonging to each node, to identify a class label for each node.

In step 1216, server 140 may input longitude, latitude, and class label data for each of the nodes into a machine learning algorithm employed by server 140 or a processor in communication with server 140. For discussion purposes, server 140 is disclosed as executing the machine learning algorithm. In some embodiments, the inputted data may be used to perform classification learning using the machine learning algorithm. Machine learning algorithms may include neural networks or other learner algorithms known to those skilled in the art.

In step 1218, server 140 may iterate through lower level nodes of the hierarchical tree structure, starting from the root node. Server 140 may analyze node data for a given level/class, and determine whether the aggregate classification accuracy of each of the children nodes in the level is below a predefined threshold for the level. If the aggregate accuracy is below the predefined level threshold, then the children nodes may be removed from the level, thereby pruning, smoothing and generalizing the level. If nodes are removed ("Yes" in step 1220), then the process may return to step 1212 for an additional iteration.

If the aggregate accuracy is above the predetermined threshold (step 1218) and no nodes are moved from the level ("No" in step 1220), then the process may proceed to step 1222, in which server 140 outputs a pruned hierarchical cluster tree structure. Server 140 may also output a classifier trained to classify leaf node relationships based on an inputted longitude and latitude, for determining a particular neighborhood for a home based on latitude and longitude data for the home. With the final iteration of the trained Machine Learning neighborhood delineatio model, users can for any given location based on longitude and latitude, determine its neighborhood membership on the finest level of the Hierarchical Clustering Tree Structure. This information can be used to partition a population of properties similarly to traditional usage of zip/county/censutract classification to partition properties. However traditional methods might have highly variable neighborhoods within while the neighborhoods learned with the proposed method would be more uniform in comparison. For majority of applications, sometimes larger neighborhoods are needed while still maintaining uniformity within the neighborhood. This can be done by first identifying the neighborhood membership of a property at the lowest level of the Hierarchical Clustering Tree Structure and then depending on the need of the user, he/she can move the properties up/down the Hierarchical Clustering Tree Datastructure to achieve bigger/smaller neighborhoods while still optimizing for uniformity within the neighborhood boundaries. This can be useful for a variety of modeling/analysis/polling applications.

In some embodiments, the home knowledge graph may enhance current statistical analyses for home valuations, to provide more accurate valuations that are "crowd sourced" based on the database on relationships between home entities. Traditional appraisals that are prepared by appraisers use 1-5 comparable homes (comps), but some selected comps vary significantly from the appraised home. The disclosed embodiments can identify comps that are in fact improper, using knowledge graph traversal techniques. For example server 140 may determine a distribution of home values associated with a particular home entity, by identifying the comps in the appraisal data, as well as relationships between the comps and other comps in different appraisals.

In some embodiments, server 140 can identify relationships between a home and comps to the nth degree of separation. In some embodiments, the value of n may be predetermined and stored in a memory. In other embodiments, the value of n may be determined dynamically based on a rule set associated with the size of the knowledge graph. As an example, server 140 may identify a comp in appraisal data for a home, representing the first-degree comp. The appraisal data for that comp may identify three more comps, representing a second-degree relationship to the original home. Server 140 may repeat this process to identify comps to a particular degree, and then generate a distribution graph of the home's valuation using the identified comps and their home value adjustments as compared to the original home. To determine a net value adjustment (or attribute adjustment) for a comp of the $2^{nd}$ degree to the home, server 140 may multiply the $1^{st}$ degree comp adjustment and the $2^{nd}$ degree comp adjustment, resulting in an edge weight between the home and the $2^{nd}$ degree comp. Server 140 may repeat this process for a plurality of comps to the n-th degree to generate sufficient data for a curve of home valuations. Using the determined curve, server 140 may identify outlying comps that fall outside of a predefined standard deviation, or other statistical outlier.

Figure 13A:
FIG. 13A illustrates an exemplary neighborhood diagram prepared using conventional systems.

FIG. 13A illustrates an exemplary cluster diagram prepared using conventional systems. As shown, the entire county is a single color, as conventional home valuation systems often utilize the average home value for a large region such as county. In the example shown, the county includes areas ranging from dense, waterfront city properties to rural inland regions, and the average home values resulting from such conventional systems would be grossly inadequate for estimating a home value in a particular area of the county.

Figure 13B:
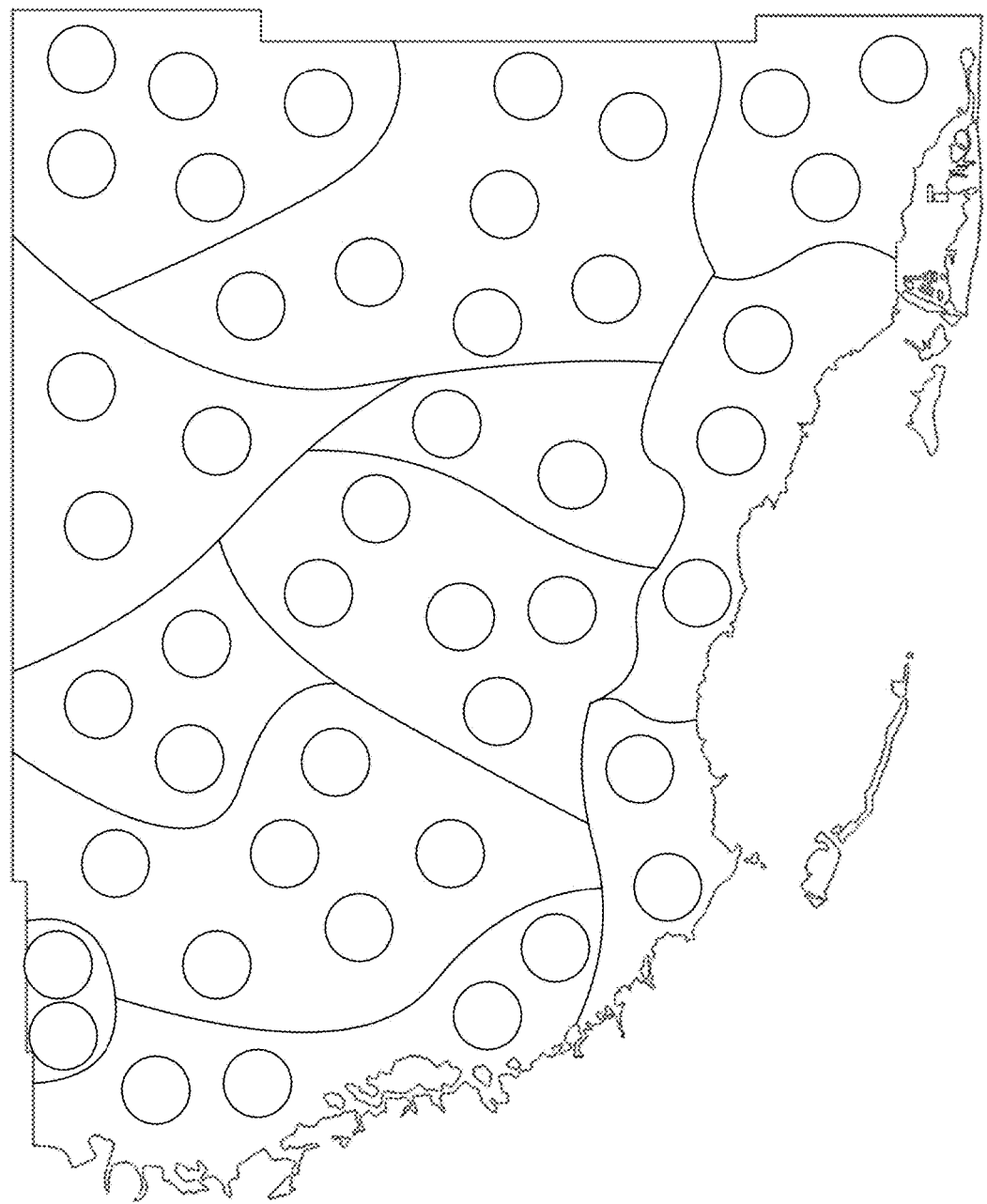
FIGS. 13B-13D illustrate exemplary cluster diagrams processed using machine learning noise reduction techniques consistent with disclosed embodiments.
Figure 13C:
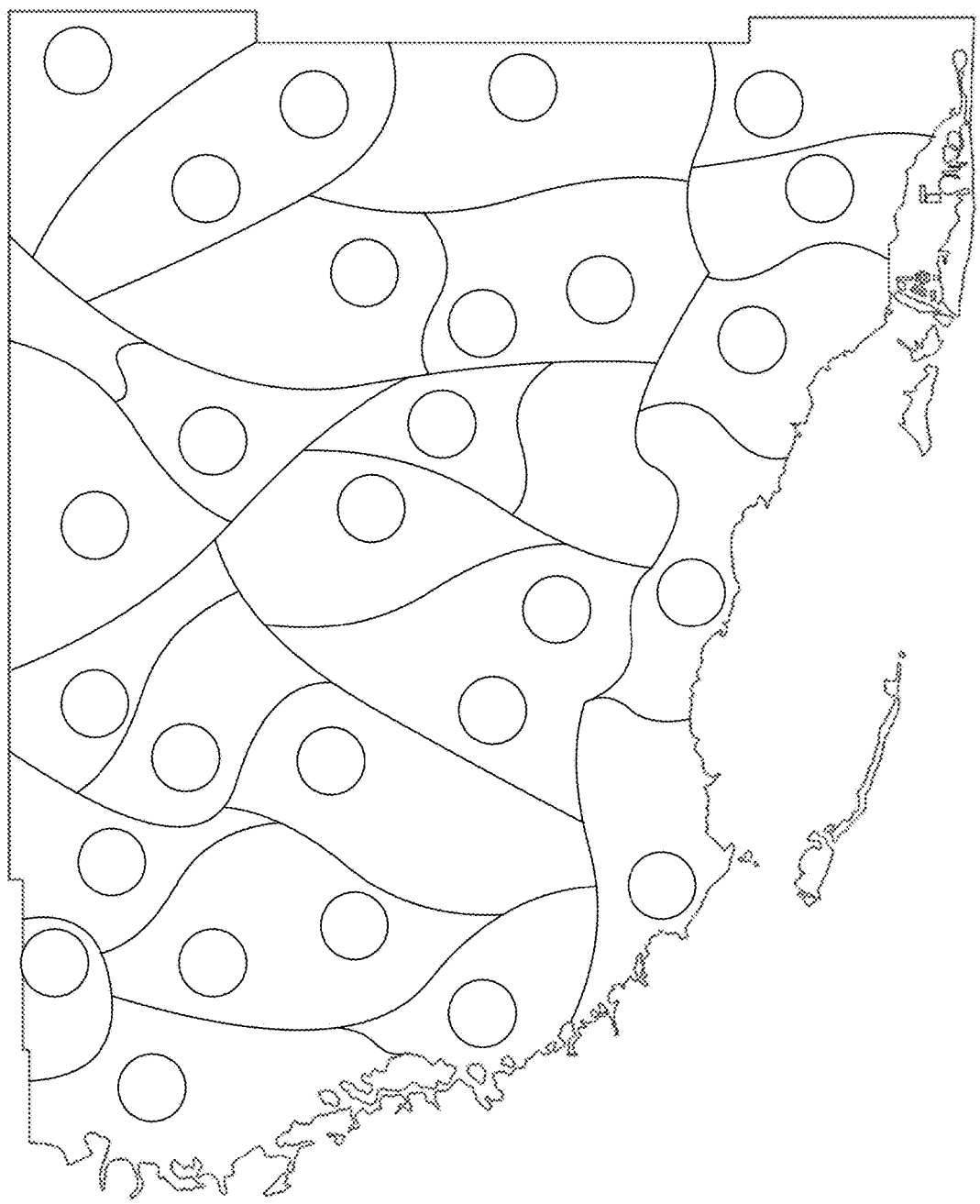
Figure 13D:
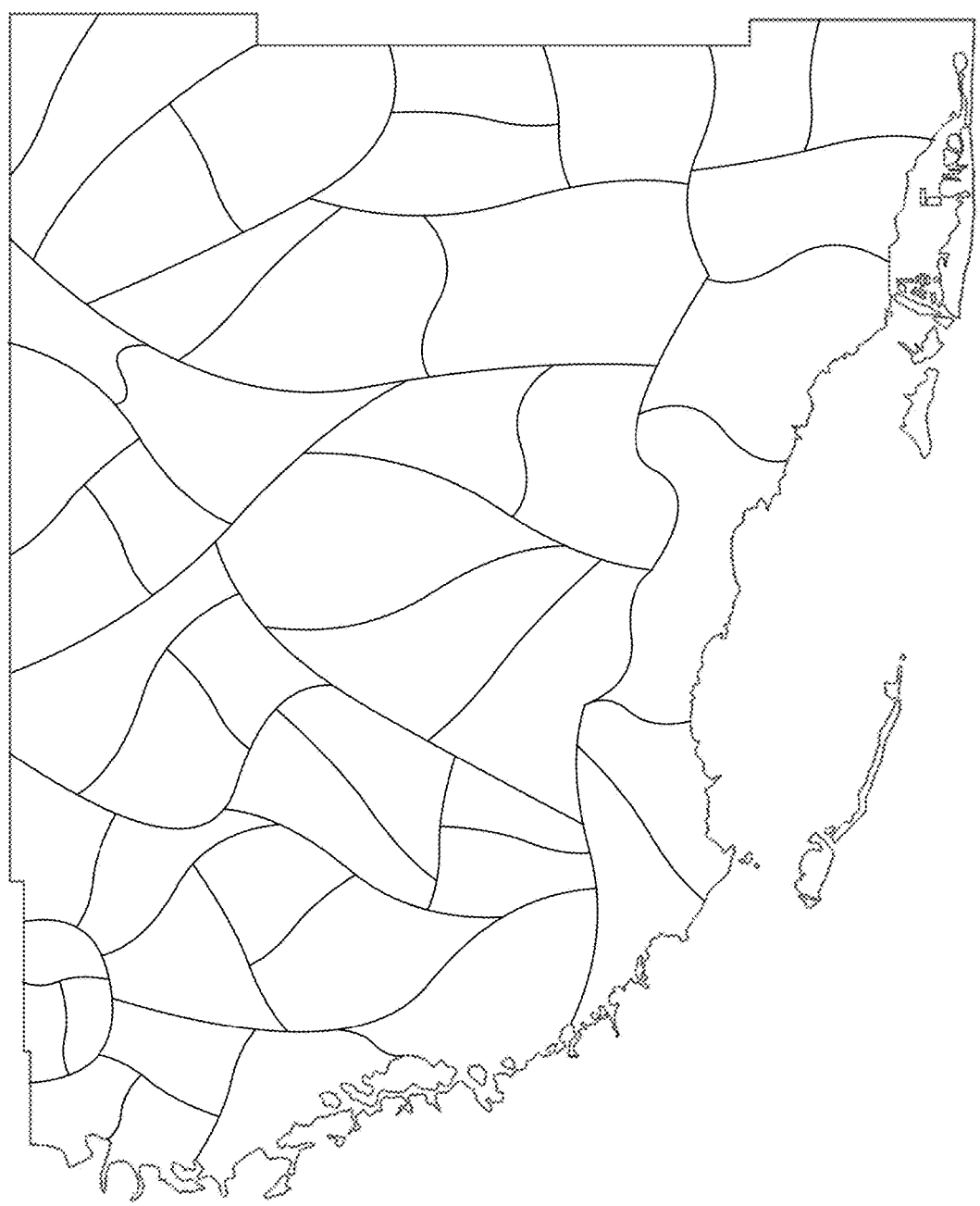

FIGS. 13B-13D illustrate exemplary neighborhood delineation through the training machine learning classifiers that to classify a properties neighborhood given its location and also removes spurious neighborhoods through generalization. As shown, the cluster diagrams may become increasingly cleaner through multiple iterations of machine learning noise reduction. Regions may include clusters having fewer scattered subclusters.

Figure 14:
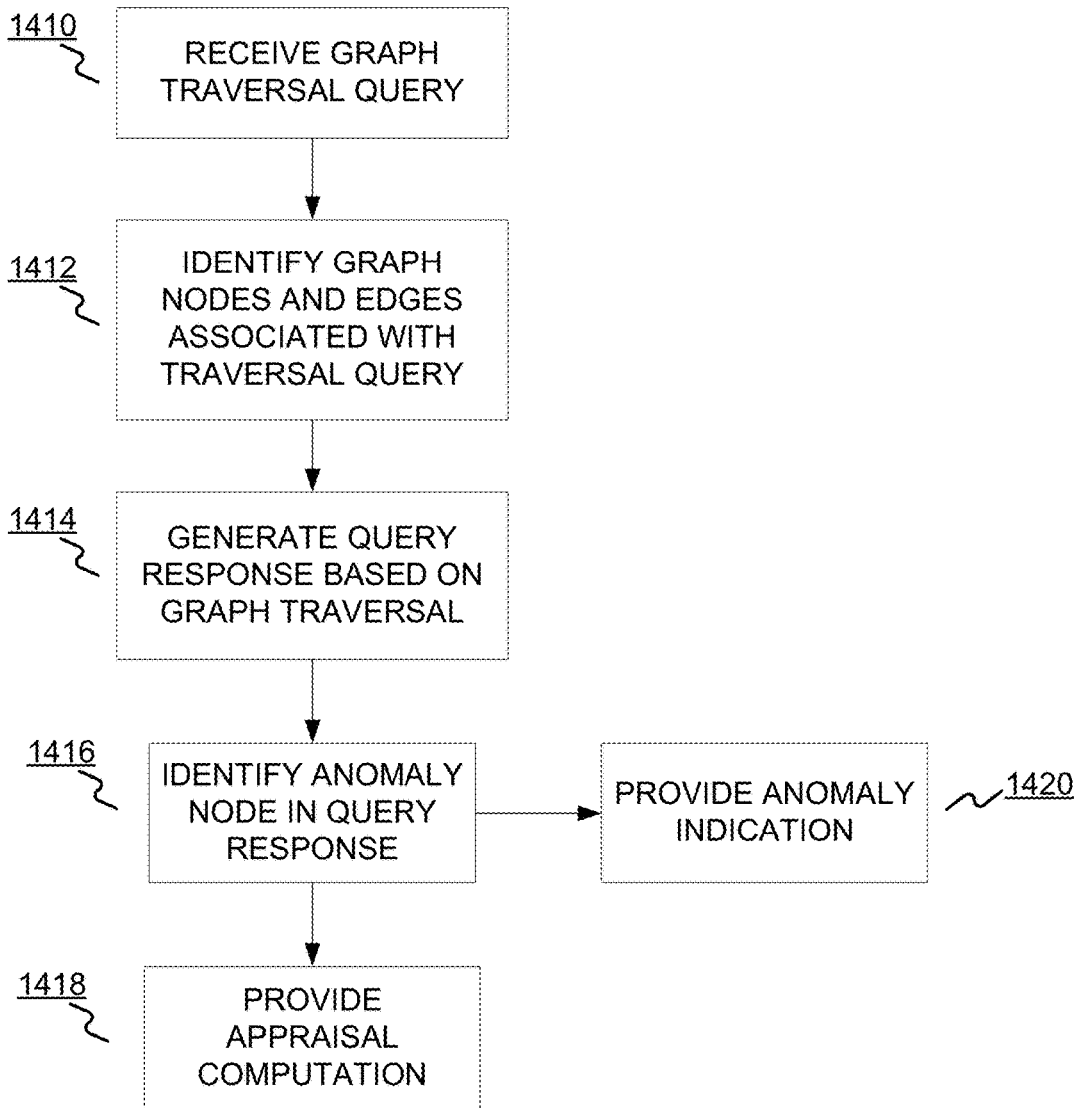
FIG. 14 shows a flowchart of an exemplary knowledge graph traversal process 1400, consistent with disclosed embodiments.

FIG. 14 shows a flowchart of an exemplary knowledge graph traversal process 1400, consistent with disclosed embodiments. In step 1410, server 140 may receive a graph traversal request. In some embodiments, server 140 may receive a request from user device 120 via network 130. In step 1412, server 140 may identify graph nodes and edges associated with traversal query.

In step 1414, server 140 may generate a query response based on graph traversal. In some embodiments, server 140 may traverse the knowledge graph using the identified nodes and edges associated with the traversal request. Server 140 may traverse the graph using one or more techniques discussed above with respect to FIGS. 3-7.

In step 1416, server 140 may identify an anomaly node based on a criterion that is problem-specific, in the query response, consistent with techniques discussed above with respect to FIGS. 5 and 6.

In step 1418, server 140 may provide appraisal computation based on the graph traversal and generated query response. In some embodiments, server 140 may generate data for displaying one or more graphical user interfaces on user device 120. Sever 140 may format the generated data for transmission over network 130.

In step 1420, server 140 may provide an anomaly indication, identifying the anomaly found in step 1416. In some embodiments, server 140 may transmit data to display an indication of the anomaly for display on user device 120.

The specification has described systems and methods for home knowledge graph representation and analysis. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A knowledge graph computer system, comprising: at least one processor;
    at least one database communicatively connected to the at least one processor; and
    a memory storing executable instructions which, when executed, cause the at least one processor to perform operations including:
    aggregating, from the at least one database, entity data for a plurality of homes;
    extracting, from the aggregated data, attribute information identifying geographic locations of the plurality of homes, and relationships between pairs of the plurality of homes;
    populating knowledge graph data structures with the extracted attribute information;
    building a home knowledge graph having nodes corresponding to the plurality of homes and edges corresponding to the identified relationships;
    determining the edges between the plurality of homes and corresponding to the identified relationships by:
    identifying at least one comp node in the attribute information;
    identifying one or more attributes of the home and the at least one comp node in the attribute information;
    determining attribute adjustments of the identified one or more attribute adjustments;
    scoring the determined attribute adjustments; and calculating an edge weight for each of the edges based on the scored attribute adjustments; and
    outputting a hierarchical cluster tree structure of the plurality of homes, wherein levels of the hierarchical cluster tree correspond to clusters of homes determined based in part on the knowledge graph edges.

2. The knowledge graph computer system of claim 1, the operations further including:
    identifying the clusters of homes in the hierarchical cluster tree, using a machine learning algorithm trained using the home geographic locations and a level of the hierarchical cluster tree.

3. The knowledge graph computer system of claim 2, wherein the at least one processor is configured to iteratively execute the machine learning algorithm to identify the clusters of homes for multiple levels of the hierarchical cluster tree.

4. The knowledge graph computer system of claim 1, wherein the calculated edge weight is directly proportional to a degree of similarity between attributes of the home and a respective comp node.

5. The knowledge graph computer system of claim 1, the operations further including:
    receiving geographic location information for an unknown home; and
    determining, using the hierarchical cluster tree structure and based on the received geographic location information, a cluster of homes to which the unknown home belongs.

6. The knowledge graph computer system of claim 1, wherein the at least one processor is part of a distributed computing system.

7. A non-transitory computer readable medium storing instructions which, when executed, cause at least one processor to perform operations comprising:
    aggregating, from at least one database communicatively connected to the at least one processor, entity data for a plurality of homes;
    extracting, from the aggregated data, attribute information identifying geographic locations of the plurality of homes, and relationships between pairs of the plurality of homes;
    populating knowledge graph data structures with the extracted attribute information;
    building a home knowledge graph having nodes corresponding to the plurality of homes and edges corresponding to the identified relationships;
    determining edges between the plurality of homes and corresponding to the identified relationships by:
    identifying at least one comp node in the attribute information; identifying one or more attributes of the home and the at least one comp node in the attribute information;
    determining attribute adjustments of the identified one or more attribute adjustments;
    scoring the determined attribute adjustments; and
    calculating an edge weight for each of the edges based on the scored attribute adjustments; and
    outputting a hierarchical cluster tree structure of the plurality of homes, wherein levels of the hierarchical cluster tree correspond to clusters of homes determined based in part on the knowledge graph edges.

8. The non-transitory computer readable medium of claim 7, the operations further including:
    identifying the clusters of homes in the hierarchical cluster tree, using a machine learning algorithm trained using the home geographic locations and a level of the hierarchical cluster tree.

9. The non-transitory computer readable medium of claim 8, wherein the at least one processor is configured to iteratively execute the machine learning algorithm to identify the clusters of homes for multiple levels of the hierarchical cluster tree.

10. The non-transitory computer readable medium of claim 7, wherein the calculated edge weight is directly proportional to a degree of similarity between attributes of the home and a respective comp node.

11. The non-transitory computer readable medium of claim 7, the operations further including:
   receiving geographic location information for an unknown home; and
   determining, using the hierarchical cluster tree structure and based on the received geographic location information, a cluster of homes to which the unknown home belongs.

12. The non-transitory computer readable medium of claim 7, wherein the at least one processor is part of a distributed computing system.

13. A knowledge graph computer system, comprising:
   at least one processor;
   at least one database communicatively connected to the at least one processor; and
   a memory storing executable instructions which, when executed, cause the at least one processor to perform operations including:
   receiving, from the at least one database, knowledge graph data structures with node data and edge data, the node data corresponding to a plurality of homes, and the edge data corresponding to identified relationships between the plurality of homes;
   building a home knowledge graph having nodes and edges based on the node data and the edge data, the home knowledge graph having a hierarchical cluster tree structure of the plurality of homes, wherein levels of the hierarchical cluster tree correspond to clusters of homes determined based in part on the knowledge graph edges;
   identifying a first cluster of homes associated with a first level of the hierarchical cluster tree structure;
   determining, for each home in the first cluster, at least one vector proportionate to a first edge weight associated with the respective home the first edge weight being directly proportional to a degree of similarity between attributes of the home and a respective comp node;
   normalizing the determined vectors;
   identifying, based on the normalized vectors, a number of homes of the first cluster that are no longer associated with the first cluster; and
   responsive to a determination that the identified number of homes is below a predetermined threshold, assigning the identified homes to a second cluster, and adding the second cluster to the hierarchical cluster tree structure.

14. The knowledge graph computer system of claim 13, the operations further including:
   receiving geographic location information for an unknown home; and determining, using the hierarchical cluster tree structure and based on the received geographic location information, a cluster of homes to which the unknown home belongs.

15. The knowledge graph computer system of claim 13, wherein the at least one processor is part of a distributed computing system.

16. The knowledge graph computer system of claim 13, wherein the number of homes of the first cluster that are no longer associated with the first cluster are identified by:
   associating a first cluster membership label to the homes of the first cluster;
   assigning a second cluster membership label to the homes based on values of the normalized vectors; and
   determining whether the first cluster membership label differs from the second cluster membership label.

17. The knowledge graph computer system of claim 13, wherein the node data includes attribute information identifying geographic locations of the plurality of homes.

* * * * *